US012804721B2

(12) United States Patent
Qiao et al.

(10) Patent No.: US 12,804,721 B2
(45) Date of Patent: Nov. 17, 2026

(54) RESOURCE ALLOCATION METHOD

(71) Applicant: BEIJING XIAOMI MOBILE SOFTWARE CO., LTD., Beijing (CN)

(72) Inventors: Xuemei Qiao, Beijing (CN); Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 284 days.

(21) Appl. No.: 18/683,215

(22) PCT Filed: Aug. 12, 2021

(86) PCT No.: PCT/CN2021/112361
§ 371 (c)(1),
(2) Date: Feb. 12, 2024

(87) PCT Pub. No.: WO2023/015537
PCT Pub. Date: Feb. 16, 2023

(65) Prior Publication Data

US 2024/0349353 A1 Oct. 17, 2024

(51) Int. Cl.
*H04W 74/0833* (2024.01)
*H04L 5/00* (2006.01)
*H04W 56/00* (2009.01)

(52) U.S. Cl.
CPC ................................ *H04W 74/0833* (2013.01)

(58) Field of Classification Search
CPC . H04W 74/0833; H04W 72/04; H04W 72/23; H04W 74/002; H04W 74/006; H04W 74/08; H04W 72/231; H04W 72/232
See application file for complete search history.

(56) References Cited

U.S. PATENT DOCUMENTS

| | | | | |
|---|---|---|---|---|
| 2020/0288506 A1* | 9/2020 | Lei | ..................... | H04W 74/0833 |
| 2021/0307073 A1* | 9/2021 | Huang | .............. | H04W 74/0833 |
| 2021/0378021 A1* | 12/2021 | You | ..................... | H04W 74/006 |
| 2022/0022251 A1* | 1/2022 | Yang | ..................... | H04L 5/0094 |
| 2022/0022259 A1* | 1/2022 | Atungsiri | .................. | H04L 1/08 |
| 2023/0262781 A1* | 8/2023 | Fang | ................. | H04W 74/0833 370/329 |

(Continued)

FOREIGN PATENT DOCUMENTS

CN 111565473 A 8/2020

OTHER PUBLICATIONS

PCT/CN2021/112361, International Search Report dated May 10, 2022, 2 pages.

(Continued)

*Primary Examiner* — Schquita D Goodwin
(74) *Attorney, Agent, or Firm* — Cozen O'Connor

(57) ABSTRACT

A resource allocation method, performed by a network device, includes: configuring indication information for a first type of terminal. The indication information is configured to indicate a physical random access channel (PRACH) resource shared by the first type of terminal. A resource allocation method, performed by a first type of terminal, includes: receiving indication information configured by a network device, and obtaining a physical random access channel (PRACH) resource shared by the first type of terminal according to the indication information.

20 Claims, 2 Drawing Sheets

(56) References Cited

U.S. PATENT DOCUMENTS

2024/0340967 A1 * 10/2024 Shin .................. H04W 74/0833

OTHER PUBLICATIONS

European Patent Application No. 21953154.8 Search Report dated Jul. 26, 2024, 11 pages.
Huawei, et al., "RACH indication and partitioning", 3GPP TSG RAN WG2 #115-e, R2-2108210, Aug. 2021, 10 pages.
Xiaomi, "Discussion on Type A PUSCH repetition for Msg3", 3GPP TSG RAN WG1 #106-e, R1-2107939, Aug. 2021, 6 pages.

* cited by examiner

RESOURCE ALLOCATION METHOD

CROSS-REFERENCE TO RELATED APPLICATIONS

The present application is a National Stage of International Application No. PCT/CN2021/112361, filed on Aug. 12, 2021, the entire contents of which are incorporated herein by reference for all purposes.

FIELD

The present disclosure relates to the field of communication technology, and more particularly, to a resource allocation method, apparatus and storage medium.

BACKGROUND

At present, in order to shorten a random access delay, the 3rd generation partnership project (3GPP) has introduced a 2-step random access channel (2-step RACH) in the Rel-16. Once a terminal initiates a random access, a network device utilizes different physical random access channel (PRACH) resources to distinguish the 2-step RACH from the 4-step random access channel (4-step RACH).

In the related art, a reduced capability user equipment (redcap UE) is provided. However, the current system does not support the redcap UE to use different preamble sequences in the shared RACH occasion (RO) resource to perform advance indication and reporting its terminal type to the network device.

SUMMARY

In a first aspect, embodiments of the present disclosure provide a resource allocation method, which is performed by a network device and includes: configuring indication information for a first type of terminal, in which the indication information is configured to indicate a physical random access channel (PRACH) resource shared by the first type of terminal.

In a second aspect, embodiments of the present disclosure provide another resource allocation method, which is performed by a first type of terminal and includes: receiving indication information configured by a network device, and obtaining a physical random access channel (PRACH) resource shared by the first type of terminal according to the indication information.

In a third aspect, embodiments of the present disclosure provide a communication device, which includes a processor. When the processor invokes a computer program in a memory, the method according to the first aspect described above is implemented.

In a fourth aspect, embodiments of the present disclosure provide a communication device, which includes a processor. When the processor invokes a computer program in a memory, the method according to the second aspect described above is implemented.

In a fifth aspect, embodiments of the present disclosure provide a communication device, which includes a processor and a memory having stored therein a computer program. The processor is configured to execute the computer program stored in the memory, to cause the communication device to implement the method according to the first aspect described above.

In a sixth aspect, embodiments of the present disclosure provide a communication device, which includes a processor and a memory having stored therein a computer program. The processor is configured to execute the computer program stored in the memory, to cause the communication device to implement the method according to the second aspect described above.

In a seventh aspect, embodiments of the present disclosure provide a communication device, which includes a processor and an interface circuit. The interface circuit is configured to receive a code instruction and transmit the code instruction to the processor, and the processor is configured to run the code instruction to make the device implement the method according to the first aspect described above.

In an eighth aspect, embodiments of the present disclosure provide a communication device, which includes a processor and an interface circuit. The interface circuit is configured to receive a code instruction and transmit the code instruction to the processor, and the processor is configured to run the code instruction to make the device implement the method according to the second aspect described above.

In a ninth aspect, embodiments of the present disclosure provide a non-transitory computer-readable storage medium for storing instructions used by the above terminal. The instructions, when executed, cause the terminal to implement the method according to the first aspect described above.

In a tenth aspect, embodiments of the present disclosure provide a non-transitory computer-readable storage medium for storing instructions used by the above network device. The instructions, when executed, cause the network device to implement the method according to the second aspect described above.

In an eleventh aspect, the present disclosure provides a chip system, which includes at least one processor and an interface, for supporting a terminal to implement functions involved in the first aspect, for example, determining or processing at least one of data and information involved in the above method. In a possible design, the chip system further includes a memory for storing computer programs and data of the terminal. The chip system may consist of chips, or may include chips and other discrete devices.

In a twelfth aspect, the present disclosure provides a chip system, which includes at least one processor and an interface, for supporting a network device to implement functions involved in the second aspect, for example, determining or processing at least one of data and information involved in the above method. In a possible design, the chip system further includes a memory for storing computer programs and data of the network device. The chip system may consist of chips, or may include chips and other discrete devices.

BRIEF DESCRIPTION OF THE DRAWINGS

In order to clearly illustrate the technical solutions in the embodiments of the present disclosure or the related art, drawings applied to the embodiments of the present disclosure or the related art are described below.

DETAILED DESCRIPTION

Figure 1:
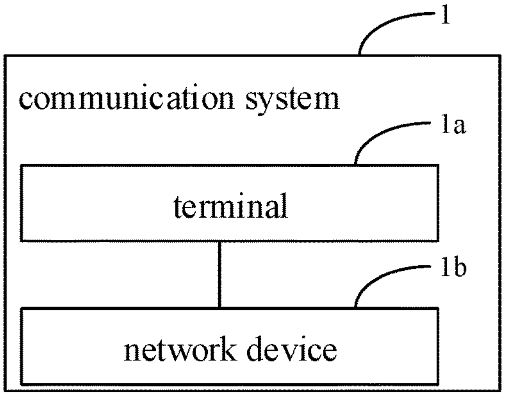
FIG. 1 is a block diagram of an architecture of a communication system provided by an embodiment of the present disclosure.

In order to better understand a resource allocation method and apparatus described in embodiments of the present disclosure, a communication system to which embodiments of the present disclosure are applicable is firstly described below.

The technical solutions of embodiments of the present disclosure may be applied to various communication systems, for example, a global system for mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunication system (UMTS), a worldwide interoperability for microwave access (WiMAX) communication system, a future 5th generation (5G) system or a new radio (NR).

The terminal in embodiments of the present disclosure may refer to a user equipment (UE), an access terminal, a user unit, a user station, a mobile station, a mobile platform, a remote station, a remote terminal, a mobile device, a user terminal, a terminal device, a wireless communication device, a user agent, or a user device. The terminal may also be a cellular phone, a cordless phone, a session initiation protocol (SIP) phone, a wireless local loop (WLL) station, a personal digital assistant (PDA), a handheld device with wireless communication capabilities, a computing device or other processing devices connected to wireless modems, a vehicle-mounted device, a wearable device, a terminal in a future 5G network or a terminal in future evolved public land mobile communication network (PLMN), which is not limited in the embodiments of the present disclosure.

The network device in embodiments of the present disclosure may be a device used to communicate with a terminal. The network device may be a base transceiver station (BTS) in the global system for mobile communication (GSM) system or the code division multiple access (CDMA) system, or may be a base station NodeB (NB) in the wideband code division multiple access (WCDMA) system, or may be an evolved NodeB (eNB or eNodeB) in an LTE system, or may be a wireless controller in a cloud radio access network (CRAN) scenario, or the network device may be a relay station, an access point, the vehicle-mounted device, the wearable device, and a network device gNodeB, (gNB) in the future 5G network or a network device in a future evolved PLMN network, which is not limited in the embodiments of the present disclosure.

In embodiments of the present disclosure, the terminal or the network device includes a hardware layer, an operating system layer running on the hardware layer, and an application layer running on the operating system layer. The hardware layer includes hardware such as a central processing unit (CPU), a memory management unit (MMU) and a memory (also called a main memory). The operating system may be any one or more computer operating systems that implement a business processing through processes, such as a Linux operating system, a Unix operating system, an Android operating system, an iOS operating system or a windows operating system, etc. The application layer includes applications, such as a browser, an address book, a word processing software, and an instant messaging software. Moreover, embodiments of the present disclosure do not specifically limit the specific structure of the execution body of the method provided by embodiments of the present disclosure, as long as it is possible to communicate by running a program that records a code of the method provided by embodiments of the present disclosure according to the method provided by embodiments of the present disclosure. For example, the execution body of the method provided by embodiments of the present disclosure may be a terminal or a network device, or a functional module in the terminal or the network device that may call a program and execute the program.

Referring to FIG. 1, FIG. 1 is a block diagram of a possible communication system 1 to which the present disclosure is applicable.

As shown in FIG. 1, the communication system 1 includes a terminal 1*a* and a network device 1*b*, which are explained respectively below.

1. Terminal 1*a*: also called a terminal device (TD), which is a device with wireless transceiver functions, and may include various handheld devices, vehicle-mounted devices, wearable devices, computing devices or other processing devices connected to wireless modems with wireless communication functions, as well as various forms of terminal devices, mobile stations (MSs), terminals, user equipment (UE), soft terminals, etc. The terminal may be deployed on the land, including indoors or outdoors, handheld or vehicle-mounted; or may also be deployed on the water (such as ships); or may also be deployed in the air (such as aircraft, balloons, or satellites), for example, a mobile phone, a tablet computer (pad), a computer with a wireless transceiver function, a virtual reality (VR) terminal, an augmented reality (AR) terminal, a wireless terminal in an industrial control, a wireless terminal in a self-driving, a wireless terminal in a remote medical, a wireless terminal in a smart grid, a wireless terminal in a transportation safety, a wireless terminal in a smart city, or a wireless terminal in a smart home.
2. (Wireless) network device (radio access network, (RAN) 1*b* is a device that provides the wireless communication function for a terminal, including, but not limited to, a next-generation base station (g nodeB, gNB) in 5G, an evolved type node B (eNB), a radio network controller (RNC), a node B (NB), a base station controller (BSC), a base transceiver station (BTS), a home base station (for example, a home evolved nodeB, or a home node B, HNB), a baseband unit (BBU), a transmitting and receiving point (TRP), or a transmitting point (TP).

It can be understood that the above functional device may be a network element in a hardware device, or a software function running on a dedicated hardware, or a virtualized function instantiated on a platform (for example, a cloud platform).

It should be noted that the communication system described in embodiments of the present disclosure is intended to illustrate the technical solutions of embodiments of the present disclosure more clearly, and does not constitute a limitation on the technical solutions provided by embodiments of the present disclosure. Those of ordinary skill in the art will know that with an evolution of a system architecture and an emergence of a new service scenario, the technical solutions provided by embodiments of the present disclosure are also applicable to similar technical problems.

A resource allocation method and apparatus thereof provided by the present disclosure will be introduced in detail below with reference to the accompanying drawings.

In these years, the Internet of Things is booming, which has brought many conveniences to human life and work. A machine type communication (MTC) technology, and a narrow band Internet of things (NB-IoT) technology are typical representatives of a cellular Internet of things technology. At present, these technologies have been used widely in many fields such as a smart city (like meter readings), a smart agriculture (such as collection of information like the temperature and humidity), and a smart transportation (such as shared bicycles).

For scenarios with low speed and high delay (such as scenarios like the meter readings, environmental monitoring, etc.) in Internet of Things services, the two technologies, i.e., the MTC and the NB-IoT are proposed in the related art. At present, the NB-IoT technology can support a maximum rate of several hundred K, and the MTC technology can support a maximum rate of several M. However, with the continuous development of Internet of Things services (such as monitoring, smart home, wearable devices, industrial sensor detections, and the like), a speed of tens to 100 M is generally required, and the requirement for the delay is also relatively high. Therefore, in the communication system, the MTC and NB-IoT technologies can no longer meet the requirements of the current Internet of Things services.

On the other hand, the MTC and NB-IoT technologies are generally deployed in basements, in the wild, or in other scenarios where it is not easy for power charging or battery replacement. Therefore, terminals associated with the MTC and NB-IoT technologies are limited in hardware, and a coverage ability thereof is not as good as that of general wireless communication terminals. Further, in consideration of the application environment, power saving of devices is also a characteristic of the MTC and NB-IoT technologies. In view of this, it has been proposed to design a new user equipment in the 5G NR to meet the requirements of this type of mid-end IoT device. In the 3GPP standardization, this new type of terminal is called a reduced capability (Redcap) terminal or a NR-lite.

In the current Rel-17 discussion, it is supported to configure the same initial downlink/uplink bandwidth part (initial DL/UL BWP) for a redcap terminal and a non-redcap terminal. At the same time, in order to implement a better link adaption during a random access process, that is, to configure a more appropriate resource element (RE) resource, and a modulation and coding scheme (MCS) level, etc. for the redcap terminal, a PRACH resource is needed to be configured for the redcap terminal, to allow the redcap terminal to perform an early indication and reporting its terminal type.

Accordingly, embodiments of the present disclosure provide a resource allocation method and apparatus to at least realize the PRACH resource configuration for the redcap terminal.

Figure 2:
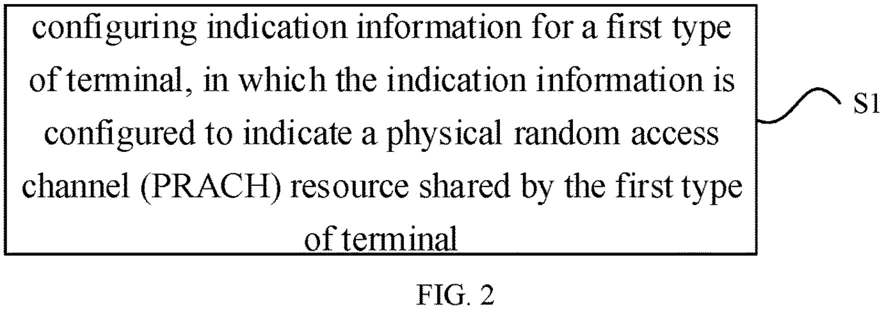
FIG. 2 is a flow chart of a resource allocation method provided by an embodiment of the present disclosure.

Referring to FIG. 2, FIG. 2 is a flow chart of a resource allocation method provided by embodiments of the present disclosure.

As shown in FIG. 2, the method is performed by a network device, and may include, but is not limited to, a following step.

In S1: indication information is configured for a first type of terminal, in which the indication information is configured to indicate a physical random access channel (PRACH) resource shared by the first type of terminal.

The first type of terminal may be a redcap terminal.

In embodiments of the present disclosure, the network device configures the indication information for the first type of terminal to indicate the PRACH resource shared by the first type of terminal. By implementing embodiments of the present disclosure, a shared PRACH resource may be configured for the first type of terminal, so that the first type of terminal may perform early indication and/or reporting its terminal type to the network device by using different preamble sequences in the shared RO resource(s). In this way, the first type of terminal may realize a better link adaption during the random access process, so as to configure a more appropriate resource element (RE) resource, and a modulation and coding scheme (MCS) level for the first type of terminal.

It should be noted that the first type of terminal may share a PRACH resource of a second type of terminal. The network device may only configure a random access channel occasion (RACH occasion, RO) resource for a two-step random access channel (2-step RACH) of the second type of terminal, or only configure a RO resource for a four-step random access channel (4-step RACH) of the second type of terminal, or configure different RO resources for a 2-step RACH and the 4-step RACH of the second type of terminal, respectively. Meanwhile, the first type of terminal may support the 2-step RACH, or support the 4-step RACH, or support both the 2-step RACH and the 4-step RACH. Therefore, when a current cell supports both the 2-step RACH and the 4-step RACH for the first type of terminal and the second type of terminal, there are many possibilities for the PRACH resource shared by the first type of terminal.

In some embodiments, in a case where only a 4-step RACH resource for a second type of terminal is configured (that is, in the case where the first type of terminal and the second type of terminal exist, the 4-step RACH resource for the second type of terminal is configured, but the 2-step RACH resource for the second type of terminal, the 4-step RACH resource for the first type of terminal and the 2-step RACH resource for the first type of terminal are not configured), a protocol stipulates or a network side configures or any other way determines that a random access channel (RACH) manner of the first type of terminal shares the 4-step RACH resource of the second type of terminal. The random access channel (RACH) manner of the first type of terminal includes at least one of the followings: a four-step random access channel (4-step RACH); and a two-step random access channel (2-step RACH).

It can be understood that the random access manner of the first type of terminal includes the 2-step RACH and the 4-step RACH. The 2-step RACH of the first type of terminal and the 4-step RACH of the first type of terminal may share the 4-step RACH resource of the second type of terminal at the same time in a case where only the 4-step RACH resource for the second type of terminal is configured.

In some embodiments, the 4-step RACH of the first type of terminal, the 2-step RACH of the first type of terminal and a 4-step RACH of the second type of terminal share a same random access channel occasion (RO) resource.

It can be understood that, in a case where the 2-step RACH of the first type of terminal and the 4-step RACH of the first type of terminal share the 4-step RACH resource of the second type of terminal, the three, i.e., the 4-step RACH of the first type of terminal, the 2-step RACH of the first type of terminal and the 4-step RACH of the second type of terminal, may share the same RO resource.

In some embodiments, in a case where one synchronization signal block (SSB) corresponds to a plurality of RO resources, a PRACH parameter (for example, the PRACH parameter may be a PRACH mask) is configured for the 2-step RACH of the first type of terminal and the 4-step RACH of the first type of terminal. The PRACH mask is configured to determine an RO subset of the 4-step RACH of the second type of terminal. The RO subset is shared by the 4-step RACH of the first type of terminal and the 2-step RACH of the first type of terminal. In embodiments of the present disclosure, the PRACH mask is used as an example for explanation. However, those skilled in the art may understand that other PRACH parameters may also be used.

In an embodiment, in a case where one SSB corresponds to 8 RO resources, a PRACH mask is configured for the 2-step RACH of the first type of terminal and the 4-step RACH of the first type of terminal. The PRACH mask is configured to determine the RO subset of the 4-step RACH of the second type of terminal, for example, the RO subset refers to even-numbered RO resource(s) among the 8 RO resources, and the even-numbered RO resource(s) is shared by the 4-step RACH of the first type of terminal and the 2-step RACH of the first type of terminal.

In another embodiment, in a case where one SSB corresponds to 8 RO resources, a PRACH mask is configured for the 2-step RACH of the first type of terminal and the 4-step RACH of the first type of terminal. The PRACH mask is configured to determine the RO subset of the 4-step RACH of the second type of terminal, for example, the RO subset refers to odd-numbered RO resource(s) among the 8 RO resources, and the odd-numbered RO resource(s) is shared by the 4-step RACH of the first type of terminal and the 2-step RACH of the first type of terminal.

In some embodiments, in a case where one SSB corresponds to a plurality of RO resources, a first PRACH mask and a second PRACH mask are respectively configured for the 2-step RACH of the first type of terminal and the 4-step RACH of the first type of terminal. The first PRACH mask is configured to determine a first subset of RO resources of the 4-step RACH of the second type of terminal, and to share the first subset with the 4-step RACH of the first type of terminal. The second PRACH mask is configured to determine a second subset of RO resources of the 4-step RACH of the second type of terminal, and to share the second subset with the 2-step RACH of the first type of terminal.

In an embodiment, in a case where one SSB corresponds to 8 RO resources, the first PRACH parameter (such as the first PRACH mask) and the second PRACH parameter (such as the second PRACH mask) are respectively configured for the 2-step RACH of the first type of terminal and the 4-step RACH of the first type of terminal. The first PRACH mask is configured to determine a first subset (such as odd-numbered RO resources) of the 8 RO resources of the 4-step RACH of the second type of terminal, and to share the first subset (the odd-numbered RO resources) with the 4-step RACH of the first type of terminal. The second PRACH mask is configured to determine a second subset (such as even-numbered RO resources) of RO resources of the 4-step RACH of the second type of terminal, and to share the second subset (the even-numbered RO resources) with the 2-step RACH of the first type of terminal.

In another embodiment, in a case where one SSB corresponds to 8 RO resources, the first PRACH mask and the second PRACH mask are respectively configured for the 2-step RACH of the first type of terminal and the 4-step RACH of the first type of terminal. The first PRACH mask is configured to determine a first subset (such as even-numbered RO resources) of the 8 RO resources of the 4-step RACH of the second type of terminal, and to share the first subset (the even-numbered RO resources) with the 4-step RACH of the first type of terminal. The second PRACH mask is configured to determine a second subset (such as odd-numbered RO resources) of RO resources of the 4-step RACH of the second type of terminal, and to share the second subset (the odd-numbered RO resources) with the 2-step RACH of the first type of terminal.

In some embodiments, in a case where one SSB corresponds to a plurality of RO resources, a third PRACH mask and a fourth PRACH mask are respectively configured for the 2-step RACH of the first type of terminal and the 4-step RACH of the first type of terminal. The third PRACH mask is configured to determine a third subset of RO resources of the 4-step RACH of the second type of terminal, and to share the third subset with the 4-step RACH of the first type of terminal. The fourth PRACH mask is configured to determine a fourth subset of RO resources of the 4-step RACH of the second type of terminal, and to share the fourth subset with the 2-step RACH of the first type of terminal.

In an embodiment, in a case where one SSB corresponds to 8 RO resources, the third PRACH mask and the fourth PRACH mask are respectively configured for the 2-step RACH of the first type of terminal and the 4-step RACH of the first type of terminal. The third PRACH mask is configured to determine the third subset (such as even-numbered RO resources) of RO resources of the 4-step RACH of the second type of terminal, and to share the third subset (the even-numbered RO resources) with the 4-step RACH of the first type of terminal. The fourth PRACH mask is configured to determine the fourth subset (such as a first RO resource among the even-numbered RO resources) of RO resources of the 4-step RACH of the second type of terminal, and to share the fourth subset (the first RO resource among the even-numbered RO resources) with the 2-step RACH of the first type of terminal.

In some embodiments, in a case where one SSB corresponds to a plurality of RO resources, when a PRACH mask is configured for the 4-step RACH of the first type of terminal and the PRACH mask is not configured for the 2-step RACH of the first type of terminal, the 2-step RACH of the first type of terminal uses the same RO resource as the 4-step RACH of the first type of terminal or uses all the same RO resources as the 4-step RACH of the second type of terminal.

In an embodiment, in a case where one SSB corresponds to 8 RO resources, when the PRACH mask is configured for the 4-step RACH of the first type of terminal, and the PRACH mask is, for example, configured to determine even-numbered RO resources shared by the 4-step RACH of the first type of terminal, but the PRACH mask is not configured for the 2-step RACH of the first type of terminal, the 2-step RACH of the first type of terminal uses the same RO resource (for example, the even-numbered RO resources) as the 4-step RACH of the first type of terminal, or uses the same RO resource as the 4-step RACH of the second type of terminal.

In a case where one SSB corresponds to a plurality of RO resources, when a PRACH mask is configured for the 2-step RACH of the first type of terminal and the PRACH mask is not configured for the 4-step RACH of the first type of terminal, the 4-step RACH of the first type of terminal uses the same RO resource as the 2-step RACH of the first type of terminal; or the 4-step RACH of the first type of terminal uses the same RO resource as the 4-step RACH of the second type of terminal; or it is not supported to configure a PRACH mask for the 2-step RACH of the first type of terminal, but not configure a PRACH mask for the 4-step RACH of the first type of terminal.

In some embodiments, in a case where a 2-step RACH resource of a second type of terminal and a 4-step RACH resource of the second type of terminal are configured, the indication information is configured to indicate: the network device instructing the first type of terminal to share at least part of the PRACH resources of the second type of terminal via a first signaling.

In embodiments of the present disclosure, the first signaling may be a remaining minimum system information (RMSI), a radio resource control (RRC), downlink control information (DCI), a media access control control element (MAC CE), other system information (OSI) and other signaling.

In a case where the 2-step RACH resource of the second type of terminal and the 4-step RACH resource of the second type of terminal are configured, the network device instruct the first type of terminal to share the 2-step RACH resource of the second type of terminal via the first signaling, or the network device indicates the first type of terminal to share the 4-step RACH resource of the second type of terminal via the first signaling, or the network device instructs the first type of terminal to share the 2-step RACH of the second type of terminal and the 4-step RACH resource of the second type of terminal via the first signaling.

In some embodiments, the network device instructing the first type of terminal to share the at least part of the PRACH resources of the second type of terminal via the first signaling includes: configuring a same first indication parameter for a 2-step RACH of the first type of terminal and a 4-step RACH of the first type of terminal; or configuring an independent second indication parameters for a 2-step RACH and a 4-step RACH of the first type of terminal respectively (that is, configuring one second indication parameter for a 2-step RACH of the first type of terminal and configuring another one second indication parameter for a 4-step RACH of the first type of terminal, where the two second indication parameter are independent to each other).

The same first indication parameter configured for the 2-step RACH of the first type of terminal and the 4-step RACH of the first type of terminal may be, for example, a 1-bit indication parameter or a 2-bit indication parameter; or the independent second indication parameters configured for the 2-step RACH and the 4-step RACH of the first type of terminal may be, for example, a 1-bit indication parameter or a 2-bit indication parameter.

In some embodiments, the first indication parameter or the second indication parameters is configured to indicate that the 2-step RACH of the first type of terminal and the 4-step RACH of the first type of terminal only share one of an RO resource of the 2-step RACH of the second type of terminal and an RO resource of the 4-step RACH of the second type of terminal. Alternatively, the first indication parameter or the second indication parameters is configured to indicate that the 2-step RACH of the first type of terminal and the 4-step RACH of the first type of terminal share at least one of the RO resource of the 2-step RACH of the second type of terminal and the RO resource of the 4-step RACH of the second type of terminal.

In an embodiment, the same first indication parameter is configured for the 2-step RACH of the first type of terminal and the 4-step RACH of the first type of terminal, for example, is the 1-bit indication parameter. In a case where the 1-bit indication parameter is "0", it indicates that the 2-step RACH of the first type of terminal and the 4-step RACH of the first type of terminal only share the RO resource(s) of the 2-step RACH of the second type of terminal. In a case where the 1-bit indication parameter is "1", it indicates that the 2-step RACH of the first type of terminal and the 4-step RACH of the first type of terminal only share the RO resource(s) of the 4-step RACH of the second type of terminal.

In another embodiment, the same first indication parameter is configured for the 2-step RACH of the first type of terminal and the 4-step RACH of the first type of terminal, for example, is the 1-bit indication parameter. In a case of the 1-bit indication parameter is "0", it indicates that the 2-step RACH of the first type of terminal and the 4-step RACH of the first type of terminal only share the RO resource(s) of the 4-step RACH of the second type of terminal. In a case where the 1-bit indication parameter is "1", it indicates that the 2-step RACH of the first type of terminal and the 4-step RACH of the first type of terminal only share the RO resource(s) of the 2-step RACH of the second type of terminal.

In an embodiment, the same first indication parameter is configured for the 2-step RACH of the first type of terminal and the 4-step RACH of the first type of terminal, for example, is the 2-bit indication parameter. In a case where the 2-bit indication parameter is "01", it indicates that the 2-step RACH of the first type of terminal and the 4-step RACH of the first type of terminal only share the RO resource(s) of the 2-step RACH of the second type of terminal. In a case where the 2-bit indication parameter is "10", it indicates that the 2-step RACH of the first type of terminal and the 4-step RACH of the first type of terminal only share the RO resource(s) of the 4-step RACH of the second type of terminal. In a case where the 2-bit indication parameter is "11", it indicates that the 2-step RACH of the first type of terminal and the 4-step RACH of the first type of terminal share the RO resource(s) of the 4-step RACH of the second type of terminal and the RO resource(s) of the 2-step RACH of the second type of terminal at the same time.

In another embodiment, the same first indication parameter is configured for the 2-step RACH of the first type of terminal and the 4-step RACH of the first type of terminal, for example, is the 2-bit indication parameter. In a case where the 2-bit indication parameter is "10", it indicates that the 2-step RACH of the first type of terminal and the 4-step RACH of the first type of terminal only share the RO resource(s) of the 4-step RACH of the second type of terminal. In a case where the 2-bit indication parameter is "01", it indicates that the 2-step RACH of the first type of terminal and the 4-step RACH of the first type of terminal only share the RO resource(s) of the 2-step RACH of the second type of terminal. Similarly, in a case where the 2-bit indication parameter is "11", it indicates that the 2-step RACH of the first type of terminal and the 4-step RACH of the first type of terminal share the RO resource(s) of the 4-step RACH of the second type of terminal and the RO resource(s) of the 2-step RACH of the second type of terminal at the same time.

In an embodiment, the independent second indication parameters are configured for the 2-step RACH and the 4-step RACH of the first type of terminal respectively, for example, are configured as the 1-bit indication parameter respectively. In a case where a 1-bit indication parameter of the 2-step RACH of the first type of terminal is "1", it indicates that the 2-step RACH of the first type of terminal shares the RO resource(s) of the 2-step RACH of the second type of terminal, and in a case where the 1-bit indication parameter of the 2-step RACH of the first type of terminal is "0", it indicates that the 2-step RACH of the first type of terminal shares the RO resource(s) of the 4-step RACH of the second type of terminal. In a case where a 1-bit indication parameter of the 4-step RACH of the first type of terminal is "1", it indicates that the 4-step RACH of the first type of terminal shares the RO resource(s) of the 2-step RACH of the second type of terminal, and in a case where the 1-bit indication parameter of the 4-step RACH of the first type of terminal is "0", it indicates that the 4-step RACH of the first type of terminal shares the RO resource(s) of the 4-step RACH of the second type of terminal.

In another embodiment, the independent second indication parameters are configured for the 2-step RACH and the 4-step RACH of the first type of terminal respectively, for example, are configured as the 1-bit indication parameter respectively. In a case where a 1-bit indication parameter of the 2-step RACH of the first type of terminal is "0", it indicates that the 2-step RACH of the first type of terminal shares the RO resource(s) of the 2-step RACH of the second type of terminal, and in a case where the 1-bit indication parameter of the 2-step RACH of the first type of terminal is "1", it indicates that the 2-step RACH of the first type of terminal shares the RO resource(s) of the 4-step RACH of the second type of terminal. In a case where a 1-bit indication parameter of the 4-step RACH of the first type of terminal is "0", it indicates that the 4-step RACH of the first type of terminal shares the RO resource(s) of the 2-step RACH of the second type of terminal, and in a case where the 1-bit indication parameter of the 4-step RACH of the first type of terminal is "1", it indicates that the 4-step RACH of the first type of terminal shares the RO resource(s) of the 4-step RACH of the second type of terminal.

In an embodiment, the independent second indication parameters are configured for the 2-step RACH and the 4-step RACH of the first type of terminal respectively, for example, are configured as the 2-bit indication parameter respectively. In a case where a 2-bit indication parameter of the 2-step RACH of the first type of terminal is "01", it indicates that the 2-step RACH of the first type of terminal shares the RO resource(s) of the 2-step RACH of the second type of terminal, in a case where the 2-bit indication parameter of the 2-step RACH of the first type of terminal is "10", it indicates that the 2-step RACH of the first type of terminal shares the RO resource(s) of the 4-step RACH of the second type of terminal, and in a case where the 2-bit indication parameter of the 2-step RACH of the first type of terminal is "11", it indicates that the 2-step RACH of the first type of terminal shares the RO resource(s) of the 4-step RACH of the second type of terminal and the RO resource(s) of the 2-step RACH of the second type of terminal. In a case where a 2-bit indication parameter of the 4-step RACH of the first type of terminal is "01", it indicates that the 4-step RACH of the first type of terminal shares the RO resource(s) of the 2-step RACH of the second type of terminal, in a case where the 2-bit indication parameter of the 4-step RACH of the first type of terminal is "10", it indicates that the 4-step RACH of the first type of terminal shares the RO resource(s) of the 4-step RACH of the second type of terminal, and in a case where the 2-bit indication parameter of the 4-step RACH of the first type of terminal is "11", it indicates that the 4-step RACH of the first type of terminal shares the RO resource(s) of the 4-step RACH of the second type of terminal and the RO resource(s) of the 2-step RACH of the second type of terminal. Alternatively, the set is the other way around.

In some embodiments, in a case where the independent second indication parameters are configured for the 2-step RACH and the 4-step RACH of the first type of terminal respectively, and the second indication parameters are configured to indicate that the 2-step RACH of the first type of terminal and the 4-step RACH of the first type of terminal only share one of the RO resource of the 2-step RACH of the second type of terminal and the RO resource of the 4-step RACH of the second type of terminal, a PRACH mask is respectively configured for the 2-step RACH of the first type of terminal and the 4-step RACH of the first type of terminal; or one same PRACH mask is configured for different RACH manners of the first type of terminal.

It can be understood that configuring the PRACH masks respectively for the 2-step RACH of the first type of terminal and the 4-step RACH of the first type of terminal may be understood as configuring one PRACH mask for the 2-step RACH of the first type of terminal, and configuring another PRACH mask for the 4-step RACH of the first type of terminal. The different RACH manners of the first type of terminal include the 4-step RACH and the 2-step RACH. Configuring the one same PRACH mask for the different RACH manners of the first type of terminal may be understood as configuring the one same PRACH mask for both the 4-step RACH and the 2-step RACH of the first type of terminal.

In an embodiment, in a case where the independent second indication parameters are configured for the 2-step RACH and the 4-step RACH of the first type of terminal respectively, and the second indication parameters are configured to indicate that the 2-step RACH of the first type of terminal shares the RO resource(s) of the 2-step RACH of the second type of terminal and the 4-step RACH of the first type of terminal shares the RO resource(s) of the 4-step RACH of the second type of terminal, one PRACH mask is configured for the 2-step RACH of the first type of terminal and the 4-step RACH of the first type of terminal, respectively.

The PRACH mask of the 2-step RACH of the first type of terminal is configured to determine a subset of RO resources of the 2-step RACH of the second type of terminal, and to share the determined subset of RO resources with the 2-step RACH of the first type of terminal. The PRACH mask of the 4-step RACH of the first type of terminal is configured to determine a subset of RO resources of the 4-step RACH of the second type of terminal, and to share the determined subset of RO resources with the 4-step RACH of the first type of terminal.

In an embodiment, in a case where the independent second indication parameters are configured for the 2-step RACH and the 4-step RACH of the first type of terminal respectively, and the second indication parameters are configured to indicate that the 2-step RACH of the first type of terminal shares the RO resource(s) of the 2-step RACH of the second type of terminal and the 4-step RACH of the first type of terminal shares the RO resource(s) of the 4-step RACH of the second type of terminal, the one same PRACH mask is configured for the different RACH manners of the first type of terminal.

The common PRACH mask of the different RACH manners of the first type of terminal is configured to determine a subset of RO resources of the 2-step RACH of the second type of terminal, and to share the determined subset with the 2-step RACH of the first type of terminal. Furthermore, the common PRACH mask of the different RACH manners of the first type of terminal is configured to determine a subset of RO resources of the 4-step RACH of the second type of terminal, and to share the determined subset with the 4-step RACH of the first type of terminal.

In some embodiments, in a case where the same first indication parameter is configured for the 2-step RACH of the first type of terminal and the 4-step RACH of the first type of terminal, and the first indication parameter is configured to indicate that the 2-step RACH of the first type of terminal and the 4-step RACH of the first type of terminal only share one of the RO resources of the 2-step RACH of the second type of terminal and the RO resources of the 4-step RACH of the second type of terminal, a PRACH mask is respectively configured for the 2-step RACH of the first type of terminal and the 4-step RACH of the first type of terminal; or one same PRACH mask is configured for different RACH manners of the first type of terminal.

In a case where the same first indication parameter is configured for the 2-step RACH of the first type of terminal and the 4-step RACH of the first type of terminal, and the first indication parameter is configured to indicate that the 2-step RACH of the first type of terminal and the 4-step RACH of the first type of terminal only share one of the RO resources of the 2-step RACH of the second type of terminal and the RO resources of the 4-step RACH of the second type of terminal, one PRACH mask is respectively configured for the 2-step RACH of the first type of terminal and the 4-step RACH of the first type of terminal. The PRACH masks of the 2-step RACH of the first type of terminal and the 4-step RACH of the first type of terminal respectively indicate that the 2-step RACH of the first type of terminal and the 4-step RACH of the first type of terminal share a part of RO resources of the 2-step RACH of the second type of terminal or a part of RO resources of the 4-step RACH of the second type of terminal.

It can be understood that the one same PRACH mask is configured for the different RACH manners of the first type of terminal, and the PRACH mask may determine a subset of RO resources of the 2-step RACH of the second type of terminal or the RO resources of the 4-step RACH of the second type of terminal, and to allow the determined subset of RO resources to be shared by the different RACH manners of the first type of terminal, including the 2-step RACH and the 4-step RACH.

In some embodiments, in a case where the independent second indication parameters are configured for the 2-step RACH and the 4-step RACH of the first type of terminal respectively, and the second indication parameters are configured to indicate that the 2-step RACH of the first type of terminal and the 4-step RACH of the first type of terminal share at least one of the RO resources of the 2-step RACH of the second type of terminal and the RO resources of the 4-step RACH of the second type of terminal, independent PRACH masks are configured for the 2-step RACH of the first type of terminal and the 4-step RACH of the first type of terminal respectively; or one same PRACH mask is configured for different RACH manners of the first type of terminal; or a PRACH mask is configured for each RO resource configuration; or a PRACH mask is respectively configured for different RO resources shared by different RACH manners: the 2-step RACH and the 4-step RACH of the first type of terminal.

In an embodiment, in a case where the second indication parameter configured for the 2-step RACH of the first type of terminal indicates that the 2-step RACH of the first type of terminal may share RO resources of the 4-step RACH and the 2-step RACH of the second type of terminal, and at the same time, the second indication parameter configured for the 4-step RACH of the first type of terminal indicates that the 4-step RACH of the first type of terminal may share RO resources configured for the 4-step RACH of the second type of terminal, one same PRACH mask is configured for the different RACH manners of the first type of terminal.

The common PRACH mask of the different RACH manners of the first type of terminal is configured to determine subsets of RO resources of the 2-step RACH and the 4-step RACH of the second type of terminal. For example, subsets of even-numbered RO resources of the 2-step PRACH and the 4-step RACH of the second type of terminal are determined via the RACH mask, and the determined subsets of even-numbered RO resources of the 4-step RACH and the 2-step RACH of the second type of terminal are shared by the 2-step RACH of the first type of terminal, and at the same time, the determined subset of RO resources of the 4-step RACH of the second type of terminal is shared by the 4-step RACH of the first type of terminal.

In another embodiment, in a case where the second indication parameter configured for the 2-step RACH of the first type of terminal indicates that the 2-step RACH of the first type of terminal may share RO resources of the 4-step RACH and the 2-step RACH of the second type of terminal, and at the same time, the second indication parameter configured for the 4-step RACH of the first type of terminal indicates that the 4-step RACH of the first type of terminal may share RO resources configured by the 4-step RACH of the second type of terminal, the independent PRACH masks are configured for the 2-step RACH of the first type of terminal and the 4-step RACH of the first type of terminal respectively.

The PRACH mask configured for the 2-step RACH of the first type of terminal determines subsets of RO resources of the 2-step RACH and the 4-step RACH of the second type of terminal. For example, subsets of even-numbered RO resources of the 2-step PRACH and the 4-step RACH of the second type of terminal are determined via the RACH mask, and the determined subsets of even-numbered RO resources of the 4-step RACH and the 2-step RACH of the second type of terminal are shared by the 2-step RACH of the first type of terminal; at the same time, the PRACH mask configured for the 4-step RACH of the first type of terminal determines a subset of RO resources of the 4-step RACH of the second type of terminal, and the determined subset of RO resources of the 4-step RACH of the second type of terminal is shared by the 4-step RACH of the first type of terminal.

In some embodiments, in a case where the same first indication parameter is configured for the 2-step RACH of the first type of terminal and the 4-step RACH of the first type of terminal, and the first indication parameter is configured to indicate that the 2-step RACH of the first type of terminal and the 4-step RACH of the first type of terminal share at least one of the RO resources of the 2-step RACH of the second type of terminal and the RO resources of the 4-step RACH of the second type of terminal, independent PRACH masks are configured for the 2-step RACH of the first type of terminal and the 4-step RACH of the first type of terminal respectively; or one same PRACH mask is configured for different RACH manners of the first type of terminal; or a PRACH mask is configured for each RO resource configuration; or a PRACH mask is respectively configured for different RO resources shared by different RACH manners: the 2-step RACH and the 4-step RACH of the first type of terminal.

In some embodiments, in a case where a 2-step RACH resource of a second type of terminal and a 4-step RACH resource of the second type of terminal are configured at the same time, a protocol stipulates or a network side configures or any other way determines that a 2-step RACH of the first type of terminal and a 4-step RACH of the first type of terminal may only share RO resource(s) of a 4-step RACH of the second type of terminal; or a protocol stipulates or a network side configures or any other way determines that a 2-step RACH resource of the first type of terminal may only share RO resource(s) of a 2-step RACH of the second type of terminal, and a 4-step RACH of the first type of terminal may only share RO resource(s) of a 4-step RACH of the second type of terminal.

In some embodiments, independent PRACH masks are configured for the 2-step RACH of the first type of terminal and the 4-step RACH of the first type of terminal respectively; or one same PRACH mask is configured for different RACH manners of the first type of terminal.

It can be understood that configuring the PRACH masks respectively for the 2-step RACH of the first type of terminal and the 4-step RACH of the first type of terminal may be understood as configuring one PRACH mask for the 2-step RACH of the first type of terminal and configuring another PRACH mask for the 4-step RACH of the first type of terminal, respectively. The different RACH manners of the first type of terminal include a 4-step RACH and a 2-step RACH. Configuring the one same PRACH mask for the different RACH manners of the first type of terminal may be understood as configuring the one same PRACH mask for both the 4-step RACH and the 2-step RACH of the first type of terminal.

In an embodiment, in a case where the 2-step RACH resource of the second type of terminal and the 4-step RACH resource of the second type of terminal are configured at the same time, and a protocol stipulates or a network side configures or any other way determines that the 2-step RACH of the first type of terminal and the 4-step RACH of the first type of terminal may only share the RO resource(s) of the 4-step RACH of the second type of terminal, the independent PRACH masks are configured for the 2-step RACH of the first type of terminal and the 4-step RACH of the first type of terminal respectively.

The PRACH mask of the 2-step RACH of the first type of terminal is configured to determine a subset of RO resources of the 4-step RACH of the second type of terminal, and to share the determined subset of RO resources with the 2-step RACH of the first type of terminal. The PRACH mask of the 4-step RACH of the first type of terminal is configured to determine a subset of RO resources of the 4-step RACH of the second type of terminal, and to share the determined subset of RO resources with the 4-step RACH of the first type of terminal.

In another embodiment, in a case where the 2-step RACH resource of the second type of terminal and the 4-step RACH resource of the second type of terminal are configured at the same time, and a protocol stipulates or a network side configures or any other way determines that the 2-step RACH of the first type of terminal and the 4-step RACH of the first type of terminal may only share the RO resource(s) of the 4-step RACH of the second type of terminal, the one same PRACH mask is configured for the different RACH manners of the first type of terminal.

The common PRACH mask of the different RACH manners of the first type of terminal is configured to determine a subset of RO resources of the 4-step RACH of the second type of terminal, and to share the determined subset with the different RACH manners (the 2-step RACH and the 4-step RACH) of the first type of terminal.

In some embodiments, in a case where a 4-step RACH resource of a second type of terminal and a 2-step RACH resource of the first type of terminal are configured, the indication information is configured to indicate: the network device indicating a PRACH resource shared by a 4-step RACH of the first type of terminal via a second signaling.

In embodiments of the present disclosure, the second signaling may be a signaling such as an RMSI, an RRC, a DCI, an MAC CE, an OSI, etc.

In some embodiments, the network device indicating the PRACH resource shared by the 4-step RACH of the first type of terminal via the second signaling includes: configuring an indication parameter for the 4-step RACH of the first type of terminal. The indication parameter is configured to indicate that the 4-step RACH of the first type of terminal shares at least one of an RO resource of the 4-step RACH of the second type of terminal and an RO resource of the 2-step RACH of the first type of terminal.

The indication parameter may be a 1-bit indication parameter, or a 2-bit indication parameter, etc.

In an embodiment, in a case where the indication parameter is the 1-bit indication parameter, the 1-bit indication parameter is configured for the 4-step RACH of the first type of terminal. In a case where the 1-bit indication parameter is "0", it indicates that the 4-step RACH of the first type of terminal shares the RO resource(s) of the 4-step RACH of the second type of terminal. In a case where the 1-bit indication parameter is "1", it indicates that the 4-step RACH of the first type of terminal shares the RO resource(s) of the 2-step RACH of the second type of terminal. Alternatively, the set is the other way around.

In an embodiment, in a case where the indication parameter is the 2-bit indication parameter, the 2-bit indication parameter is configured for the 4-step RACH of the first type of terminal. In a case where the 2-bit indication parameter is "01", it indicates that the 4-step RACH of the first type of terminal shares the RO resource(s) of the 4-step RACH of the second type of terminal. In a case where the 2-bit indication parameter is "10", it indicates that the 4-step RACH of the first type of terminal shares the RO resource(s) of the 2-step RACH of the second type of terminal. In a case where the 2-bit indication parameter is "11", it indicates that the 4-step RACH of the first type of terminal shares the RO resource(s) of the 2-step RACH of the second type of terminal and the RO resource(s) of the 4-step RACH of the second type of terminal. Alternatively, the set is the other way around.

In some embodiments, in a case where a 2-step RACH resource of a second type of terminal, a 4-step RACH resource of the second type of terminal, and a 2-step RACH resource of the first type of terminal are configured, the indication information is configured to indicate: the network device indicating a PRACH resource shared by a 4-step RACH of the first type of terminal via a third signaling.

In embodiments of the present disclosure, the third signaling may be a signaling such as an RMSI, an RRC, a DCI, an MAC CE, an OSI, etc.

In some embodiments, the network device indicating the PRACH resources shared by the first type of terminal via the third signaling includes: configuring an indication parameter for the 4-step RACH of the first type of terminal. The indication parameter is configured to indicate that the 4-step RACH of the first type of terminal shares at least one of an RO resource of a 2-step RACH of the second type of terminal, an RO resource of a 4-step RACH of the second type of terminal, and an RO resource of a 2-step RACH of the first type of terminal.

The indication parameter may be a 3-bit indication parameter, or other parameters.

In an embodiment, in a case where the indication parameter is the 3-bit indication parameter, the 3-bit indication parameter is configured for the 4-step RACH of the first type of terminal. In a case where the 3-bit indication parameter is "001", it indicates that the 4-step RACH of the first type of terminal shares the RO resource(s) of the 4-step RACH of the second type of terminal. In a case where the 3-bit indication parameter is "010", it indicates that the 4-step RACH of the first type of terminal shares the RO resource(s) of the 2-step RACH of the second type of terminal. In a case where the 3-bit indication parameter is "100", it indicates that the 4-step RACH of the first type of terminal shares the RO resource(s) of the 2-step RACH of the first type of terminal. In a case where the 3-bit indication parameter is "011", it indicates that the 4-step RACH of the first type of terminal shares the RO resource(s) of the 4-step RACH of the second type of terminal and the RO resource(s) of the 2-step RACH of the second type of terminal. In a case where the 3-bit indication parameter is "101", it indicates that the 4-step RACH of the first type of terminal shares the RO resource(s) of the 4-step RACH of the second type of terminal and the RO resource(s) of the 2-step RACH of the first type of terminal. In a case where the 3-bit indication parameter is "110", it indicates that the 4-step RACH of the first type of terminal shares the RO resource(s) of the 2-step RACH of the second type of terminal and the RO resource(s) of the 2-step RACH of the first type of terminal. In a case where the 3-bit indication parameter is "111", it indicates that the 4-step RACH of the first type of terminal shares the RO resource(s) of the 2-step RACH of the second type of terminal, the RO resource(s) of the 2-step RACH of the second type of terminal and the RO resource(s) of the 2-step RACH of the first type of terminal. Alternatively, the set is the other way around.

In some embodiments, in a case where a 4-step RACH resource of a second type of terminal and a 2-step RACH resource of the first type of terminal are configured at the same time, a protocol stipulates or a network side configures or any other way determines that configuring the 2-step RACH resource of the first type of terminal but not configuring a 4-step RACH resource of the first type of terminal are not supported in an initial random access phase; or a protocol stipulates or a network side configures or any other way determines that a 4-step RACH of the first type of terminal shares RO resource(s) of a 2-step RACH of the first type of terminal; or a protocol stipulates or a network side configures or any other way determines that a 4-step RACH of the first type of terminal shares RO resource(s) of a 4-step RACH of the second type of terminal.

In some embodiments, in a case where a 2-step RACH resource of a second type of terminal, a 4-step RACH resource of the second type of terminal and a 2-step RACH resource of the first type of terminal are configured at the same time, a protocol stipulates or a network side configures or any other way determines that configuring the 2-step RACH resource of the first type of terminal but not configuring a 4-step RACH resource of the first type of terminal in an initial random access phase are not supported; or a protocol stipulates or a network side configures or any other way determines that a 4-step RACH of the first type of terminal shares RO resource(s) of a 2-step RACH of the first type of terminal; or a protocol stipulates or a network side configures or any other way determines that a 4-step RACH of the first type of terminal shares RO resource(s) of a 4-step RACH of the second type of terminal.

In some embodiments, in a case where the 4-step RACH of the first type of terminal shares a plurality of RO resource configurations, one same PRACH mask is configured for a plurality of RO resources; or a PRACH mask is configured for each RO resource configuration.

It can be understood that in a case where the 4-step RACH of the first type of terminal shares the plurality of RO resource configurations, the one same PRACH mask is configured for the plurality of RO resources. The one same PRACH mask configured for the plurality of RO resources is configured to determine subset(s) of the plurality of RO resources, and to share the determined subset(s) with the 4-step RACH of the first type of terminal.

In some embodiments, in a case where the 4-step RACH of the first type of terminal shares the plurality of RO resource configurations, and the one same PRACH mask is configured for the plurality of RO resources, if a plurality of SSBs correspond to one RO resource in a first RO resource configuration, the PRACH mask is invalid for the first RO resource; or the PRACH mask is invalid for all RO resources; or the one same PRACH mask configured for the plurality of RO resources is not used.

In some embodiments, in a case where resources of the first type of terminal and a 4-step RACH resource of a second type of terminal are configured, the indication information is configured to indicate: the network device indicating a PRACH resource shared by a 2-step RACH of the first type of terminal via a fourth signaling.

In embodiments of the present disclosure, the fourth signaling may be a signaling such as an RMSI, an RRC, a DCI, an MAC CE, an OSI, etc.

In some embodiments, the network device indicating the PRACH resource shared by the 2-step RACH of the first type of terminal via the fourth signaling includes: configuring an indication parameter for the 2-step RACH of the first type of terminal. The indication parameter is configured to indicate that the 2-step RACH of the first type of terminal shares at least one of an RO resource of the 4-step RACH of the second type of terminal and an RO resource of a 4-step RACH of the first type of terminal.

In some embodiments, in a case where a 4-step RACH resource of the first type of terminal, a 2-step RACH resource of a second type of terminal, and a 4-step RACH resource of the second type of terminal are configured, the indication information is configured to indicate: the network device indicating a PRACH resource shared by the 2-step RACH of the first type of terminal via a fifth signaling.

In embodiments of the present disclosure, the fifth signaling may be a signaling such as an RMSI, an RRC, a DCI, an MAC CE, an OSI, etc.

In some embodiments, the network device indicating the PRACH resource shared by the 2-step RACH of the first type of terminal via the fifth signaling includes: configuring an indication parameter for the 2-step RACH of the first type of terminal. The indication parameter is configured to indicate that the 2-step RACH of the first type of terminal shares at least one of an RO resource of a 4-step RACH of the second type of terminal, an RO resource of a 2-step RACH of the second type of terminal and an RO resource of a 4-step RACH of the first type of terminal.

In some embodiments, in a case where a 4-step RACH resource of the first type of terminal and a 4-step RACH resource of a second type of terminal are configured at the same time, a protocol stipulates or a network side configures or any other way determines that a 2-step RACH of the first type of terminal shares RO resource(s) of a 4-step RACH of the second type of terminal; or a 2-step RACH of the first type of terminal shares RO resource(s) of a 4-step RACH of the first type of terminal.

In some embodiments, in a case where the 4-step RACH resource of the first type of terminal, a 2-step RACH resource of the second type of terminal and the 4-step RACH resource of the second type of terminal are configured at the same time, a protocol stipulates or a network side configures or any other way determines that the 2-step RACH of the first type of terminal shares the RO resource(s) of the 4-step RACH of the first type of terminal; or a protocol stipulates or a network side configures or any other way determines that the 2-step RACH of the first type of terminal shares the RO resource(s) of the 2-step RACH of the second type of terminal; or a protocol stipulates or a network side configures or any other way determines that the 2-step RACH of the first type of terminal shares the RO resource(s) of the 4-step RACH of the second type of terminal.

In some embodiments, in a case where the 4-step RACH of the first type of terminal shares a plurality of RO resource configurations, one same PRACH mask is configured for a plurality of RO resources; or a PRACH mask is configured for each RO resource configuration.

In some embodiments, in a case where the one same PRACH mask is configured for the plurality of RO resources, if a plurality of SSBs correspond to one RO resource in a first RO resource configuration, the PRACH mask is invalid for the first RO resource; or the PRACH mask is invalid for all RO resources; or the one same PRACH mask configured for the plurality of RO resources is not used.

In some embodiments, in a case where one SSB corresponds to a plurality of RO resources, RO resources of different random access resource configurations are jointly encoded, and at least one RO resource is indicated as the RO resource shared by a 2-step RACH of the first type of terminal and a 4-step RACH of the first type of terminal via a code point or bitmap manner.

It can be understood that in embodiments of the present disclosure, in a case where one SSB corresponds to the plurality of RO resources, the RO resources of the different random access resource configurations are jointly encoded, and at least one the RO resources is indicated as the RO resource shared by the 2-step RACH of the first type of terminal and the 4-step RACH of the first type of terminal via the code point or bitmap manner, and in this manner an indication field used by the RO configuration in original RACH manners may be canceled.

In some embodiments, the random access resource configuration includes: a configuration only for a 4-step RACH resource of a second type of terminal; or a configuration for a 2-step RACH resource of a second type of terminal and a 4-step RACH resource of the second type of terminal; or a configuration for a 4-step RACH resource of a second type of terminal and a 2-step RACH resource of the first type of terminal; or a configuration for a 2-step RACH resource of a second type of terminal, a 4-step RACH resource of the second type of terminal, and a 2-step RACH resource of the first type of terminal; or a configuration for a 4-step RACH resource of the first type of terminal and a 4-step RACH resource of a second type of terminal; or a configuration for a 4-step RACH resource of the first type of terminal, a 2-step RACH resource of a second type of terminal, and a 4-step RACH resource of the second type of terminal.

In an embodiment, the random access resource configuration is the configuration of the 2-step RACH resource of the second type of terminal, the 4-step RACH resource of the second type of terminal, and the 4-step RACH resource of the first type of terminal. The 2-step RACH of the first type of terminal may share the RO resources for the three resource configurations, and a mapping relationship between the SSB and the RO resource of the 4-step RACH of the first type of terminal is 1:2, and a mapping relationship between the SSB and the RO of the 4-step RACH of the second type of terminal is 1:4, and a mapping relationship between the SSB and the RO of the 2-step RACH of the second type of terminal is 1:2.

The 2-step RACH of the first type of terminal may share the resources for the three configurations, which may be indicated in a bitmap manner. For example, 8 bits "11001000" are configured for indication, where first two bits "11" indicate that the 2-step RACH of the first type of terminal may share all the ROs of the 4-step RACH of the first type of terminal, the following four bits "0010" indicate that the 2-step RACH of the first type of terminal may share a third RO resource of the 4-step RACH of the second type of terminal, and the last two bits "00" indicate that the 2-step RACH of the first type of terminal does not share the RO resource(s) of the 2-step RACH of the second type of terminal.

Similarly, the code point manner may also be used for indications.

In some embodiments, a protocol stipulates or a network side configures or any other way determines that different PRACH mask values are configured for different features of the first type of terminal and/or a second type of terminal in a case where one SSB corresponds to a plurality of RO resources and the first type of terminal shares at least part of PRACH resources of the second type of terminal.

It can be understood that in a case where one SSB corresponds to the plurality of RO resources and the first type of terminal shares at least part of the PRACH resources of the second type of terminal, for example, when the 2-step RACH of the first type of terminal and the 4-step PRACH of the first type of terminal and the 2-step RACH of the second type of terminal share the RO resource(s) of the 4-step RACH of the second type of terminal at the same time, in order to avoid an excessive division of a preamble of the same RO resource, a protocol stipulates or a network side configures or any other way determines that the different PRACH mask values are configured for the different features of the first type of terminal and/or the second type of terminal. In an embodiment, the different features of the first type of terminal and/or the second type of terminal may include: a small data transmission (SDT), a slice, a coverage enhancement, a small data packet transmission, and a network slicing.

In some embodiments, a fifth PRACH mask corresponding to sharing two RO indexes is configured in a case where one SSB corresponds to a plurality of RO resources.

It can be understood that in embodiments of the present disclosure, an RO subset configuration table may be enhanced. As shown in Table 1 below, reserved bits 11 to 14 of the RO subset indication provide the RO indexes containing two ROs that are allowable to be shared, and the fifth PRACH mask corresponding to sharing the two RO indexes is configured. At least one fifth PRACH mask may be provided.

TABLE 1

| RO subset indication | RO index allowing to be shared |
|---|---|
| 0 | all ROs |
| 1 | RO index 1 |
| 2 | RO index 2 |
| 3 | RO index 3 |

TABLE 1-continued

| RO subset indication | RO index allowing to be shared |
|---|---|
| 4 | RO index 4 |
| 5 | RO index 5 |
| 6 | RO index 6 |
| 7 | RO index 7 |
| 8 | RO index 8 |
| 9 | even-indexed ROs |
| 10 | odd-indexed ROs |
| 11 | 1~2 |
| 12 | 3~4 |
| 13 | 5~6 |
| 14 | 7~8 |
| 15 | reserved bits |

In some embodiments, the fifth PRACH mask is configured for the first type of terminal. A 2-step RACH of the first type of terminal shares an RO resource of an even index of the two RO indexes, and a 4-step RACH of the first type of terminal shares an RO resource of an odd index of the two RO indexes. Alternatively, a 2-step RACH of the first type of terminal shares an RO resource of an odd index of the two RO indexes, and a 4-step RACH of the first type of terminal shares an RO resource of an even index of the two RO indexes.

In some embodiments, a 2-step RACH of the first type of terminal and a 4-step RACH of the first type of terminal are indicated to share RO resources of the two RO indexes via an indication signaling.

In an embodiment, an indication is performed via the indication signaling. One SSB corresponds to N RO resources, and N bits are set accordingly. "0" indicates that it is not used for sharing with the first type of terminal, and "1" indicates that it is used for sharing with the first type of terminal. Alternatively, the set is the other way around.

In some embodiments, in a case where a current cell only supports 2-step RACHs for the first type of terminal and a second type of terminal, and only a 2-step RACH resource for the second type of terminal is configured (that is, the 2-step RACH resource for the second type of terminal is configured, but the 4-step RACH resource for the second type of terminal, the 4-step RACH resource for the first type of terminal and the 2-step RACH resource for the first type of terminal are not configured), a protocol stipulates or a network side configures or any other way determines that a 2-step RACH of the first type of terminal shares the 2-step RACH resource of the second type of terminal.

It can be understood that the current cell only supports the 2-step RACH for the first type of terminal and the second type of terminal, and the first type of terminal and the second type of terminal may only use the 2-step RACH for a random access in the current cell.

In some embodiments, in a case where one SSB corresponds to a plurality of RO resources, a PRACH mask is configured for the 2-step RACH of the first type of terminal. The PRACH mask is configured to determine a subset of RO resources of the 2-step RACH of the second type of terminal, and to share the subset of RO resources with the 2-step RACH of the first type of terminal.

It can be understood that in the case where only the 2-step RACH resource for the second type of terminal is configured, the protocol stipulates or the network side configures or any other way determines that the 2-step RACH of the first type of terminal shares the 2-step RACH resource of the second type of terminal, one PRACH mask is configured for the 2-step RACH of the first type of terminal. The PRACH mask determines the subset of RO resources of the 2-step RACH of the second type of terminal to allow the subset of RO resources to be shared with the 2-step RACH of the first type of terminal, thereby indicating the PRACH resource(s) shared by the 2-step RACH of the first type of terminal.

In some embodiments, in a case where a current cell only supports 4-step RACHs for the first type of terminal and a second type of terminal, and a 4-step RACH resource for only configuring the second type of terminal exists, a protocol stipulates or a network side configures or any other way determines that a 4-step RACH of the first type of terminal shares the 4-step RACH resource of the second type of terminal.

It can be understood that the current cell only supports the 4-step RACHs for the first type of terminal and the second type of terminal, and the first type of terminal and the second type of terminal may only use the 4-step RACH for a random access in the current cell.

In some embodiments, in a case where one SSB corresponds to a plurality of RO resources, a PRACH mask is configured for the 4-step RACH of the first type of terminal. The PRACH mask is configured to determine a subset of RO resources of the 4-step RACH of the second type of terminal, and the subset of RO resources are shared with the 4-step RACH of the first type of terminal.

It can be understood that in a case where only the 4-step RACH resource for the second type of terminal is configured, a protocol stipulates or a network side configures or any other way determines that the 4-step RACH of the first type of terminal shares the 4-step RACH resource of the second type of terminal, one PRACH mask is configured for the 4-step RACH of the first type of terminal. The PRACH mask determines the subset of RO resources of the 4-step RACH of the second type of terminal to allow the subset of RO resources to be shared with the 4-step RACH of the first type of terminal, thereby indicating the PRACH resource(s) shared by the 4-step RACH of the first type of terminal.

Figure 3:
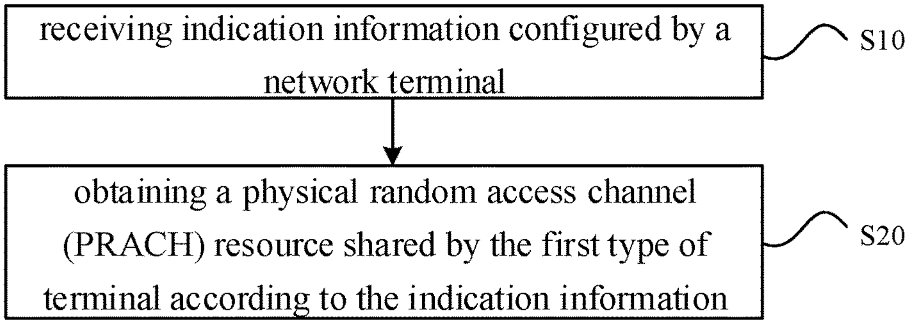
FIG. 3 is a flow chart of a resource allocation method provided by another embodiment of the present disclosure.

For a second aspect of embodiments of the present disclosure, referring to FIG. 3, FIG. 3 is a flow chart of a resource allocation method provided by embodiments of the present disclosure.

As shown in FIG. 3, the method is performed by a first type of terminal. The method may include, but is not limited to, the following steps.

In S10, indication information configured by a network device is received.

In S20, a physical random access channel (PRACH) resource shared by the first type of terminal is obtained according to the indication information.

The first type of terminal may be a redcap terminal.

In embodiments of the present disclosure, the first type of terminal receives the indication information configured by the network device, and obtains the physical random access channel (PRACH) resource shared by the first type of terminal according to the indication information. By implementing embodiments of the present disclosure, the shared PRACH resource may be configured for the first type of terminal, so that the first type of terminal may perform early indication and/or reporting its terminal type to the network device by using different preamble sequences in the shared RO resource(s). In this way, the first type of terminal may realize a better link adaption during the random access process, so as to configure a more appropriate resource element (RE) resource, and a modulation and coding scheme (MCS) level for the first type of terminal.

In some embodiments, in a case where only a 4-step RACH resource for a second type of terminal is configured, a protocol stipulates or a network side configures or any other way determines the 4-step RACH resource of the second type of terminal is shared by a random access channel (RACH) manner of the first type of terminal. The random access channel (RACH) manner of the first type of terminal includes at least one of the followings: a four-step random access channel (4-step RACH); and a two-step random access channel (2-step RACH).

In some embodiments, the 4-step RACH of the first type of terminal, the 2-step RACH of the first type of terminal and a 4-step RACH of the second type of terminal share a same random access channel occasion (RO) resource.

In some embodiments, in a case where one synchronization signal block (SSB) corresponds to a plurality of RO resources, a PRACH mask configured by the network device for the 2-step RACH of the first type of terminal and the 4-step RACH of the first type of terminal is received. The PRACH mask is configured to determine a RO subset of the 4-step RACH of the second type of terminal, and the RO subset is shared by the 4-step RACH of the first type of terminal and the 2-step RACH of the first type of terminal.

In some embodiments, in a case where one SSB corresponds to a plurality of RO resources, a first PRACH mask and a second PRACH mask respectively, configured by the network device, for the 2-step RACH of the first type of terminal and the 4-step RACH of the first type of terminal are received. The first PRACH mask is configured to determine a first subset of RO resources of the 4-step RACH of the second type of terminal, and to share the first subset with the 4-step RACH of the first type of terminal. The second PRACH mask is configured to determine a second subset of RO resources of the 4-step RACH of the second type of terminal, and to share the second subset with the 2-step RACH of the first type of terminal.

In some embodiments, in a case where one SSB corresponds to a plurality of RO resources, a third PRACH mask and a fourth PRACH mask respectively, configured by the network device, for the 2-step RACH of the first type of terminal and the 4-step RACH of the first type of terminal are received. The third PRACH mask is configured to determine a third subset of RO resources of the 4-step RACH of the second type of terminal, and to share the third subset with the 4-step RACH of the first type of terminal. The fourth PRACH mask is configured to determine a fourth subset of RO resources of the 4-step RACH of the second type of terminal, and to share the fourth subset with the 2-step RACH of the first type of terminal.

In some embodiments, in a case where one SSB corresponds to a plurality of RO resources, the 2-step RACH of the first type terminal uses the same RO resource as the 4-step RACH of the first type of terminal or uses the same RO resource as the 4-step RACH of the second type of terminal when a PRACH mask configured by the network device for the 4-step RACH of the first type of terminal and the PRACH mask not configured by the network device for the 2-step RACH of the first type of terminal are received.

In some embodiments, in a case where one SSB corresponds to a plurality of RO resources, when a PRACH mask configured by the network device for the 2-step RACH of the first type of terminal and the PRACH mask not configured by the network device for the 4-step RACH of the first type of terminal are received, the 4-step RACH of the first type of terminal uses the same RO resource as the 2-step RACH of the first type of terminal; or the 4-step RACH of the first type of terminal uses the same RO resource as the 4-step RACH of the second type of terminal; or it is not supported to configure a PRACH mask for the 2-step RACH of the first type of terminal but not configure the PRACH mask for the 4-step RACH of the first type of terminal.

In some embodiments, in a case where a 2-step RACH resource of a second type of terminal and a 4-step RACH resource of the second type of terminal are configured, according to the indication information: a first signaling of the network device is received. The first type of terminal shares at least part of PRACH resources of the second type of terminal.

In some embodiments, receiving the first signaling of the network device (in which the first type of terminal shares the at least part of the PRACH resources of the second type of terminal) includes: receiving a same first indication parameter configured by the network device for a 2-step RACH of the first type of terminal and a 4-step RACH of the first type of terminal; or receiving two independent second indication parameters configured by the network device for a 2-step RACH and a 4-step RACH of the first type of terminal respectively.

In some embodiments, according to the first indication parameter or the second indication parameters, the 2-step RACH of the first type of terminal and the 4-step RACH of the first type of terminal only share one of an RO resource of the 2-step RACH of the second type of terminal and an RO resource of the 4-step RACH of the second type of terminal; or according to the first indication parameter or the second indication parameters, the 2-step RACH of the first type of terminal and the 4-step RACH of the first type of terminal share at least one of an RO resource of the 2-step RACH of the second type of terminal and an RO resource of the 4-step RACH of the second type of terminal.

In some embodiments, in a case where the two independent second indication parameters respectively configured by the network device for the 2-step RACH and the 4-step RACH of the first type of terminal are received, and the 2-step RACH of the first type of terminal and the 4-step RACH of the first type of terminal only share one of the RO resource of the 2-step RACH of the second type of terminal and the RO resource of the 4-step RACH of the second type of terminal according to the second indication parameters, a PRACH mask respectively configured by the network device for the 2-step RACH of the first type of terminal and the 4-step RACH of the first type of terminal is received; or one same PRACH mask configured by the network device for different RACH manners of the first type of terminal is received.

In some embodiments, in a case where the same first indication parameter configured by the network device for the 2-step RACH of the first type of terminal and the 4-step RACH of the first type of terminal is received, and the 2-step RACH of the first type of terminal and the 4-step RACH of the first type of terminal only share one of the RO resource of the 2-step RACH of the second type of terminal and the RO resource of the 4-step RACH of the second type of terminal according to the first indication parameter, a PRACH mask respectively configured by the network device for the 2-step RACH of the first type of terminal and the 4-step RACH of the first type of terminal is received; or one same PRACH mask configured by the network device for different RACH manners of the first type of terminal is received.

In some embodiments, in a case where the two independent second indication parameters respectively configured by the network device for the 2-step RACH and the 4-step RACH of the first type of terminal are received, and the 2-step RACH of the first type of terminal and the 4-step RACH of the first type of terminal share at least one of the RO resource of the 2-step RACH of the second type of terminal and the RO resource of the 4-step RACH of the second type of terminal according to the second indication parameters, two independent PRACH masks respectively configured by the network device for the 2-step RACH of the first type of terminal and the 4-step RACH of the first type of terminal are received; or one same PRACH mask configured by the network device for different RACH manners of the first type of terminal is received; or a PRACH mask configured by the network device for each RO resource configuration is received; or a PRACH mask respectively configured by the network device for different RO resources shared by different RACH manners: the 2-step RACH and the 4-step RACH of the first type of terminal is received.

In some embodiments, in a case where the same first indication parameter configured by the network device for the 2-step RACH of the first type of terminal and the 4-step RACH of the first type of terminal is received, and the 2-step RACH of the first type of terminal and the 4-step RACH of the first type of terminal share at least one of the RO resource of the 2-step RACH of the second type of terminal and the RO resource of the 4-step RACH of the second type of terminal according to the first indication parameter, two independent PRACH masks respectively configured by the network device for the 2-step RACH of the first type of terminal and the 4-step RACH of the first type of terminal are received; or one same PRACH mask configured by the network device for different RACH manners of the first type of terminal is received; or a PRACH mask configured by the network device for each RO resource configuration is received; or a PRACH mask respectively configured by the network device for different RO resources shared by different RACH manners: the 2-step RACH and the 4-step RACH of the first type of terminal is received.

In some embodiments, in a case where a 2-step RACH resource of a second type of terminal and a 4-step RACH resource of the second type of terminal are configured at the same time, a protocol stipulates or a network side configures or any other way determines that a 2-step RACH of the first type of terminal and a 4-step RACH of the first type of terminal only share an RO resource of a 4-step RACH of the second type of terminal; or a protocol stipulates or a network side configures or any other way determines that a 2-step RACH of the first type of terminal only shares an RO resource of a 2-step RACH of the second type of terminal, and a 4-step RACH of the first type of terminal only shares an RO resource of a 4-step RACH of the second type of terminal.

In some embodiments, independent PRACH masks respectively configured by the network device for the 2-step RACH of the first type of terminal and the 4-step RACH of the first type of terminal are received; or one same PRACH mask configured by the network device for different RACH manners of the first type of terminal is received.

In some embodiments, in a case where a 4-step RACH resource of a second type of terminal and a 2-step RACH resource of the first type of terminal are configured, according to the indication information: a second signaling of the network device is received. A PRACH resource is shared by a 4-step RACH of the first type of terminal.

In some embodiments, receiving the second signaling of the network device (in which the PRACH resource shares by the 4-step RACH of the first type of terminal) includes: receiving an indication parameter configured by the network device for the 4-step RACH of the first type of terminal. The 4-step RACH of the first type of terminal shares at least one of an RO resource of the 4-step RACH of the second type of terminal and an RO resource of the 2-step RACH of the first type of terminal according to the indication parameter.

In some embodiments, in a case where a 2-step RACH resource of a second type of terminal, a 4-step RACH resource of the second type of terminal, and a 2-step RACH resource of the first type of terminal are configured, according to the indication information: a third signaling of the network device is received. A PRACH resource is shared by a 4-step RACH of the first type of terminal.

In embodiments of the present disclosure, the third signaling may be a signaling such as an RMSI, an RRC, a DCI, an MAC CE, an OSI, etc.

In some embodiments, receiving the third signaling includes: receiving an indication parameter configured by the network device for the 4-step RACH of the first type of terminal. The 4-step RACH of the first type of terminal shares at least one of an RO resource of a 2-step RACH of the second type of terminal, an RO resource of a 4-step RACH of the second type of terminal, and an RO resource of a 2-step RACH of the first type of terminal according to the indication parameter.

In some embodiments, in a case where a 4-step RACH resource of a second type of terminal and a 2-step RACH resource of the first type of terminal are configured at the same time, a protocol stipulates or a network side configures or any other way determines that it is not supported to configure the 2-step RACH resource of the first type of terminal but not configure a 4-step RACH resource of the first type of terminal in an initial random access phase; or a protocol stipulates or a network side configures or any other way determines that a 4-step RACH of the first type of terminal shares an RO resource of a 2-step RACH of the first type of terminal; or a protocol stipulates or a network side configures or any other way determines that a 4-step RACH of the first type of terminal shares an RO resource of a 4-step RACH of the second type of terminal.

In some embodiments, in a case where a 2-step RACH resource of a second type of terminal, a 4-step RACH resource of the second type of terminal and a 2-step RACH resource of the first type of terminal are configured at the same time, a protocol stipulates or a network side configures or any other way determines that it is not supported to configure the 2-step RACH resource of the first type of terminal but not configure a 4-step RACH resource of the first type of terminal in an initial random access phase; or a protocol stipulates or a network side configures or any other way determines that a 4-step RACH of the first type of terminal shares an RO resource of a 2-step RACH of the first type of terminal; or a protocol stipulates or a network side configures or any other way determines that a 4-step RACH of the first type of terminal shares an RO resource of a 4-step RACH of the second type of terminal.

In some embodiments, in a case where the 4-step RACH of the first type of terminal shares a plurality of RO resource configurations, one same PRACH mask configured by the network device for a plurality of RO resources is received; or a PRACH mask configured by the network device for each RO resource configuration is received.

In some embodiments, in a case where the 4-step RACH of the first type of terminal shares the plurality of RO resource configurations, and the one same PRACH mask configured by the network device for the plurality of RO resources is received, when a plurality of SSBs correspond to one RO resource in a first RO resource configuration, the PRACH mask is invalid for the first RO resource; or the PRACH mask is invalid for all RO resources; or the one same PRACH mask configured by the network device for the plurality of RO resources is not used.

In some embodiments, in a case where resources of the first type of terminal and a 4-step RACH resource of a second type of terminal are configured, a fourth signaling of the network device is received for indicating a PRACH resource shared by a 2-step RACH of the first type of terminal.

In embodiments of the present disclosure, the fourth signaling may be a signaling such as an RMSI, an RRC, a DCI, an MAC CE, an OSI, etc.

In some embodiments, receiving the fourth signaling includes: receiving an indication parameter configured by the network device for the 2-step RACH of the first type of terminal. The 2-step RACH of the first type of terminal shares at least one of an RO resource of the 4-step RACH of the second type of terminal and an RO resource of a 4-step RACH of the first type of terminal according to the indication parameter.

In some embodiments, in a case where a 4-step RACH resource of the first type of terminal, a 2-step RACH resource of a second type of terminal, and a 4-step RACH resource of the second type of terminal are configured, according to the indication information: a fifth signaling of the network device is received. A PRACH resource is shared by the 2-step RACH of the first type of terminal.

In embodiments of the present disclosure, the fifth signaling may be a signaling such as an RMSI, an RRC, a DCI, an MAC CE, an OSI, etc.

In some embodiments, receiving the fifth signaling includes: receiving an indication parameter configured by the network device for the 2-step RACH of the first type of terminal. The 2-step RACH of the first type of terminal shares at least one of an RO resource of a 4-step RACH of the second type of terminal, an RO resources of a 2-step RACH of the second type of terminal and an RO resource of a 4-step RACH of the first type of terminal according to the indication parameter.

In some embodiments, in a case where a 4-step RACH resource of the first type of terminal and a 4-step RACH resource of a second type of terminal are configured at the same time, a protocol stipulates or a network side configures or any other way determines that a 2-step RACH of the first type of terminal shares an RO resource of a 4-step RACH of the second type of terminal; or a protocol stipulates or a network side configures or any other way determines that a 2-step RACH of the first type of terminal shares an RO resource of a 4-step RACH of the first type of terminal.

In some embodiments, in a case where the 4-step RACH resource of the first type of terminal, a 2-step RACH resource of the second type of terminal and the 4-step RACH resource of the second type of terminal are configured at the same time, a protocol stipulates or a network side configures or any other way determines that the 2-step RACH of the first type of terminal shares an RO resource of a 4-step RACH of the first type of terminal; or a protocol stipulates or a network side configures or any other way determines that the 2-step RACH of the first type of terminal shares an RO resource of a 2-step RACH of the second type of terminal; or a protocol stipulates or a network side configures or any other way determines that the 2-step RACH of the first type of terminal shares an RO resource of a 4-step RACH of the second type of terminal.

In some embodiments, in a case where the 4-step RACH of the first type of terminal shares a plurality of RO resource configurations, one same PRACH mask configured by the network device for a plurality of RO resources is received; or a PRACH mask configured by the network device for each RO resource configuration is received.

In some embodiments, in a case where the one same PRACH mask configured by the network device for the plurality of RO resources is received, when a plurality of SSBs correspond to one RO resource in a first RO resource configuration, the PRACH mask is invalid for the first RO resource; or the PRACH mask is invalid for all RO resources; or the one same PRACH mask configured by the network device for the plurality of RO resources is not used.

In some embodiments, in a case where one SSB corresponds to a plurality of RO resources, RO resources of different random access resource configurations are jointly encoded, and at least one RO resource is received as an RO resource shared by a 2-step RACH of the first type of terminal and a 4-step RACH of the first type of terminal indicated via a code point or bitmap manner.

It can be understood that in embodiments of the present disclosure, in the case where one SSB corresponds to the plurality of RO resources, the RO resources of the different random access resource configurations are jointly encoded, and at least one RO resource indicated by the network device is received as the RO resource shared by the 2-step RACH of the first type of terminal and the 4-step RACH of the first type of terminal via the code point or bitmap manner. In this case, an indication field used by the RO configuration usage in original different RACH manners may be canceled.

In some embodiments, the random access resource configuration include: a configuration only for a 4-step RACH resource of a second type of terminal; or a configuration for a 2-step RACH resource of a second type of terminal and a 4-step RACH resource of the second type of terminal; or a configuration for a 4-step RACH resource of a second type of terminal and a 2-step RACH resource of the first type of terminal; or a configuration for a 2-step RACH resource of a second type of terminal, a 4-step RACH resource of the second type of terminal, and a 2-step RACH resource of the first type of terminal; or a configuration for a 4-step RACH resource of the first type of terminal and a 4-step RACH resource of a second type of terminal; or a configuration for a 4-step RACH resource of the first type of terminal, a 2-step RACH resource of a second type of terminal, and a 4-step RACH resource of the second type of terminal.

In an embodiment, the random access resource configuration is the configuration of the 2-step RACH resource of the second type of terminal, the 4-step RACH resource of the second type of terminal, and the 4-step RACH resource of the first type of terminal. The 2-step RACH of the first type of terminal may share the RO resources for the three resource configurations, and a mapping relationship between the SSB and the RO resource of the 4-step RACH of the first type of terminal is 1:2, and a mapping relationship between the SSB and the RO of the 4-step RACH of the second type of terminal is 1:4, and a mapping relationship between the SSB and the RO of the 2-step RACH of the second type of terminal is 1:2.

The 2-step RACH of the first type of terminal may share the resources for the three configurations, which may be indicated in a bitmap manner. For example, 8 bits "11001000" are configured for indication, where first two bits "11" indicate that the 2-step RACH of the first type of terminal may share all the ROs of the 4-step RACH of the first type of terminal, the following four bits "0010" indicate that the 2-step RACH of the first type of terminal may share a third RO resource of the 4-step RACH of the second type of terminal, and the last two bits "00" indicate that the 2-step RACH of the first type of terminal does not share the RO resource(s) of the 2-step RACH of the second type of terminal.

Similarly, the code point manner may also be used for indications.

In some embodiments, a protocol stipulates or a network side configures or any other way determines that different PRACH mask values are configured for different features of the first type of terminal and/or a second type of terminal in a case where one SSB corresponds to a plurality of RO resources and the first type of terminal shares at least part of PRACH resources of a second type of terminal.

It can be understood that in a case where one SSB corresponds to the plurality of RO resources and the first type of terminal shares at least part of the PRACH resources of the second type of terminal, for example, when the 2-step RACH of the first type of terminal, the 4-step PRACH of the first type of terminal and the 2-step RACH of the second type of terminal share the RO resource(s) of the 4-step RACH of the second type of terminal at the same time, in order to avoid an excessive division of a preamble of the same RO resource, a protocol stipulates or a network side configures or any other way determines that the different PRACH mask values are configured for the different features of the first type of terminal and/or the second type of terminal.

In some embodiments, a fifth PRACH mask corresponding to sharing two RO indexes is configured in a case where one SSB corresponds to a plurality of RO resources.

It can be understood that in embodiments of the present disclosure, an RO subset configuration table may be enhanced. As shown in Table 1 below, reserved bits 11 to 14 of the RO subset indication provide the RO indexes containing two ROs that are allowable to be shared, and the fifth PRACH mask corresponding to sharing the two RO indexes is configured. At least one fifth PRACH mask may be provided.

TABLE 1

| RO subset indication | RO index allowing to be shared |
|---|---|
| 0 | all ROs |
| 1 | RO index 1 |
| 2 | RO index 2 |
| 3 | RO index 3 |
| 4 | RO index 4 |
| 5 | RO index 5 |
| 6 | RO index 6 |
| 7 | RO index 7 |
| 8 | RO index 8 |
| 9 | even-indexed ROs |
| 10 | odd-indexed ROs |
| 11 | 1~2 |
| 12 | 3~4 |
| 13 | 5~6 |
| 14 | 7~8 |
| 15 | reserved bits |

In some embodiments, the fifth PRACH mask configured by the network device for the first type of terminal is received. A 2-step RACH of the first type of terminal shares an RO resource of an even index of the two RO indexes, and a 4-step RACH of the first type of terminal shares an RO resource of an odd index of the two RO indexes. Alternatively, a 2-step RACH of the first type of terminal shares an RO resource of an odd index of the two RO indexes, and a 4-step RACH of the first type of terminal shares an RO resource of an even index of the two RO indexes.

In some embodiments, an indication signaling sent by the network device is obtained. A 2-step RACH of the first type of terminal and a 4-step RACH of the first type of terminal share RO resources of the two RO indexes.

In an embodiment, the indication signaling sent by the network device is obtained. One SSB corresponds to N RO resources, and N bits are set accordingly. "0" indicates that it is not used for sharing by the first type of terminal, and "1" indicates that it is used for sharing by the first type of terminal. Alternatively, the set is the other way around.

In some embodiments, in a case where a current cell only supports 2-step RACHs for the first type of terminal and a second type of terminal, and only a 2-step RACH resource for the second type of terminal is configured, a protocol stipulates or a network side configures or any other way determines that a 2-step RACH of the first type of terminal shares the 2-step RACH resource of the second type of terminal.

It can be understood that the current cell only supports the 2-step RACH for the first type of terminal and the second type of terminal, and the first type of terminal and the second type of terminal may only use the 2-step RACH for a random access in the current cell.

In some embodiments, in a case where one SSB corresponds to a plurality of RO resources, a PRACH mask configured by the network device for the 2-step RACH of the first type of terminal is received. The PRACH mask is configured to determine a subset of RO resources of the 2-step RACH of the second type of terminal, and to share the subset of RO resources with the 2-step RACH of the first type of terminal.

It can be understood that in the case where only the 2-step RACH resource for the second type of terminal is configured, and the protocol stipulates or the network side configures or any other way determines that the 2-step RACH of the first type of terminal shares the 2-step RACH resource of the second type of terminal, one PRACH mask configured by the network device for the 2-step RACH of the first type of terminal is received. The PRACH mask determines the subset of RO resources of the 2-step RACH of the second type of terminal to allow the subset of RO resources to be shared with the 2-step RACH of the first type of terminal, thereby obtaining the PRACH resource(s) shared by the 2-step RACH of the first type of terminal.

In some embodiments, in a case where a current cell only supports 4-step RACHs for the first type of terminal and a second type of terminal, and only a 4-step RACH resource for the second type of terminal is configured, a protocol stipulates or a network side configures or any other way determines that a 4-step RACH of the first type of terminal shares the 4-step RACH resource of the second type of terminal.

It can be understood that the current cell only supports the 4-step RACHs for the first type of terminal and the second type of terminal, and the first type of terminal and the second type of terminal may only use the 4-step RACH for a random access in the current cell.

In some embodiments, in a case where one SSB corresponds to a plurality of RO resources, a PRACH mask configured by the network device for the 4-step RACH of the first type of terminal is received. The PRACH mask is configured to determine a subset of RO resources of the 4-step RACH of the second type of terminal, and the subset of RO resources are shared with the 4-step RACH of the first type of terminal.

It can be understood that in a case where only the 4-step RACH resource for the second type of terminal is configured, the protocol stipulates or the network side configures or any other way determines that the 4-step RACH of the first type of terminal shares the 4-step RACH resource of the second type of terminal, one PRACH mask configured by the network device for the 4-step RACH of the first type of terminal is received. The PRACH mask determines the subset of RO resources of the 4-step RACH of the second type of terminal to allow the subset of RO resources to be shared with the 4-step RACH of the first type of terminal, thereby obtaining the PRACH resource(s) shared by the 4-step RACH of the first type of terminal.

In the above embodiments provided by the present disclosure, the methods provided in embodiments of the present disclosure are introduced from perspectives of the network device, and the first type of terminal, respectively. In order to implement the various functions in the methods provided by the above embodiments of the present disclosure, the network device and the first type of terminal may include a hardware structure and a software module, and implement the above functions in a form of the hardware structure, the software module, or the hardware structure plus the software module. A certain function among the above mentioned functions may be implemented in the form of the hardware structure, the software module, or the hardware structure plus the software module.

Figure 4:
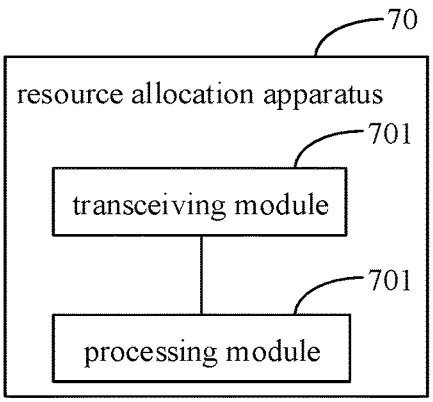
FIG. 4 is a block diagram of a resource allocation apparatus provided by an embodiment of the present disclosure.

Referring to FIG. 4, FIG. 4 is a block diagram of a resource allocation apparatus 70 provided by embodiments of the present disclosure. The resource allocation apparatus 70 shown in FIG. 4 may include a transceiving module 701 and a processing module 702. The transceiving module 701 may include a sending module and/or a receiving module. The sending module is configured to implement a sending function, and the receiving module is configured to implement a receiving function. The transceiving module 701 may implement the sending function and/or the receiving function.

The resource allocation apparatus 70 may be a first type of terminal, a device in the first type of terminal, or a device that can be used in conjunction with the first type of terminal. Alternatively, the communication apparatus 70 may be a network device, a device in the network device, or a device that can be used in conjunction with the network device.

The resource allocation apparatus 70 is the network device. The transceiving module 701 is configured to configure indication information for a first type of terminal. The indication information is configured to indicate a physical random access channel (PRACH) resource shared by the first type of terminal.

The resource allocation apparatus 70 is the first type of terminal. The transceiving module 701 is configured to receive indication information configured by a network device, and a processing module 702 is configured to obtain a physical random access channel (PRACH) resource shared by the first type of terminal according to the indication information.

Figure 5:
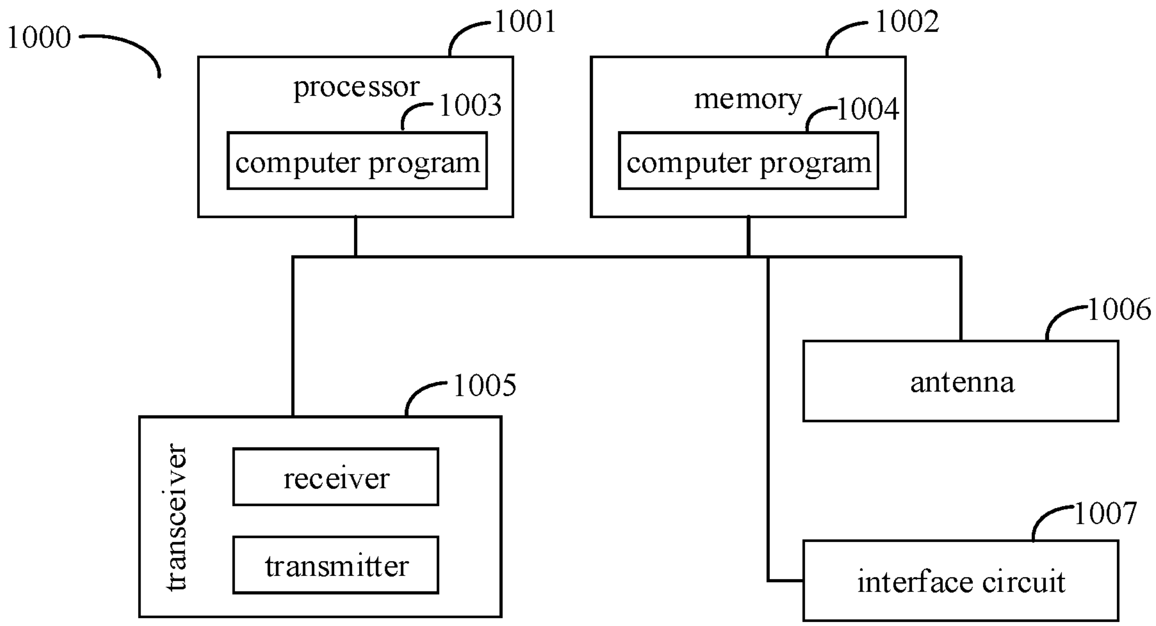
FIG. 5 is a block diagram of a communication device provided by an embodiment of the present disclosure.

Referring to FIG. 5, FIG. 5 is a block diagram of a communication device 1000 provided by embodiments of the present disclosure.

The communication device 1000 may be a network device, may also be a terminal device, may also be a chip, a chip system, or a processor that supports the network device to implement the above method, or may also be a chip, a chip system, or a processor that supports the terminal device to implement the above method. The device may be used to implement the methods as described in the above method embodiments, and for details, reference may be made to the descriptions on the above method embodiments.

The communication device 1000 may include at least one processor 1001. The processor 1001 may be a general-purpose processor or a special-purpose processor. For example, it may be a baseband processor or a central processing unit. The baseband processor may be configured to process a communication protocol and communication data, and the central processing unit may be configured to control a communication device (such as a base station, a baseband chip, a terminal device, a terminal device chip, a DU or a CU, etc.), execute computer programs, and process data of computer programs.

In an embodiment, the communication device 1000 may further include at least one memory 1002 that may have stored therein a computer program 1004. The memory 1002 executes the computer program 1004 to cause the communication device 1000 to implement the methods as described in the above method embodiments. In an embodiment, the memory 1002 may have stored therein data. The communication device 1000 and the memory 1002 may be set separately or integrated together.

In an embodiment, the communication device 1000 may further include a transceiver 1005 and an antenna 1006. The transceiver 1005 may be called a transceiving element, a transceiving machine, a transceiving circuit or the like, for implementing a transceiving function. The transceiver 1005 may include a receiver and a transmitter. The receiver may be called a receiving machine, a receiving circuit or the like, for implementing a receiving function. The transmitter may be called a transmitting machine, a transmitting circuit or the like for implementing a transmitting function.

In an embodiment, the communication device 1000 may further include at least one interface circuit 1007. The interface circuit 1007 is configured to receive a code instruction and transmit the code instruction to the processor 1001. The processor 1001 runs the code instruction to enable the communication device 1000 to execute the methods as described in the foregoing method embodiments.

The communication device 1000 is the network device, and the transceiver 1005 is configured to execute the S1 in FIG. 2.

The communication device 1000 is the first type of terminal, and the transceiver 1005 is configured to execute the S10 in FIG. 3. The processor 1001 is configured to execute the S20 in FIG. 3.

In an implementation manner, the processor 1001 may include the transceiver configured to implement receiving and sending functions. For example, the transceiver may be a transceiving circuit, an interface, or an interface circuit. The transceiving circuit, the interface or the interface circuit configured to implement the receiving and sending functions may be provided separately or may be integrated together. The above transceiving circuit, interface or interface circuit may be configured to read and write codes/data, or the above transceiving circuit, interface or interface circuit may be configured to transmit or transfer signals.

In an implementation manner, the processor 1001 may have stored therein a computer program 1003 that, when run on the processor 1001, causes the communication device 1000 to implement the method as described in the foregoing method embodiments. The computer program 1003 may be solidified in the processor 1001, and in this case, the processor 1001 may be implemented by a hardware.

In an implementation manner, the communication device 1000 may include a circuit, and the circuit may implement the sending, receiving or communicating function in the foregoing method embodiments. The processor and the transceiver described in the present disclosure may be implemented on an integrated circuit (IC), an analog IC, a radio frequency integrated circuit (RFIC), a mixed-signal IC, an application specific integrated circuit (ASIC), a printed circuit board (PCB), an electronic device, etc. The processor and the transceiver may also be manufactured with various IC process technologies, such as a complementary metal oxide semiconductor (CMOS), an nMetal-oxide-semiconductor (NMOS), a P-type metal oxide semiconductor (PMOS), a bipolar junction transistor (BJT), a bipolar CMOS (BiCMOS), silicon germanium (SiGe), gallium arsenide (GaAs), etc.

The communication device described in the above embodiments may be the terminal device (such as the first type of terminal in the foregoing method embodiments), but the scope of the communication device described in the present disclosure is not limited thereto, and a structure of the communication device is not limited by FIG. 5. The communication device may be a stand-alone device or may be a part of a larger device. For example, the communication device may be: (1) a stand-alone integrated circuit (IC), or a chip, or a chip system or a subsystem; (2) a set of one or more ICs, in an embodiment, the set of ICs may also include a storage component for storing data and computer programs; (3) an ASIC, such as a modem; (4) a module that may be embedded in other devices; (5) a receiver, a terminal device, an intelligent terminal device, a cellular phone, a wireless device, a handheld machine, a mobile unit, a vehicle device, a network device, a cloud device, an artificial intelligence device, etc.; (6) others.

Figure 6:
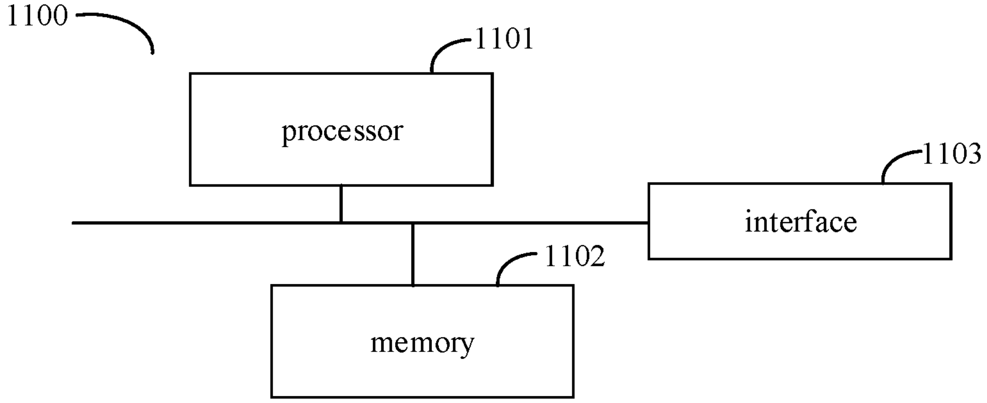
FIG. 6 is a block diagram of a chip provided by an embodiment of the present disclosure.

For the case where the communication device may be a chip or a chip system, it may be referred to FIG. 6, which is a block diagram of a chip provided by embodiments of the present disclosure.

As shown in FIG. 6, the chip 1100 includes a processor 1101 and an interface 1103. In the chip, at least one processor 1101 may be provided, and more than one interface 1103 may be provided.

For the case where the chip is used to implement functions of the first type of terminal in embodiments of the present disclosure, the interface 1103 is configured to receive a code instruction and transmit it to the processor, and the processor 1101 is configured to run the code instruction to perform the resource allocation method described in some of the above embodiments.

For the case where the chip is used to implement functions of the network device in embodiments of the present disclosure, the interface 1103 is configured to receive a code instruction and transmit it to the processor; and the processor 1101 is configured to run the code instruction to perform the resource allocation method described in some of the above embodiments.

In an embodiment, the chip 1100 further includes a memory 1102 for storing computer programs and data.

Those skilled in the art may also understand that various illustrative logical blocks and steps listed in embodiments of the present disclosure may be implemented by an electronic hardware, a computer software, or a combination thereof. Whether such functions are implemented by a hardware or a software depends on specific applications and design requirements of an overall system. For each specific application, those skilled in the art may use various methods to implement the described functions, but such implementation should not be understood as beyond the protection scope of embodiments of the present disclosure.

The present disclosure further provides a readable storage medium having stored therein instructions that, when executed by a computer, cause functions of any of the above method embodiments to be implemented.

The present disclosure further provides a computer program product that, when executed by a computer, causes functions of any of the above method embodiments to be implemented.

The above embodiments may be implemented in whole or in part by a software, a hardware, a firmware or any combination thereof. When implemented using the software, the above embodiments may be implemented in whole or in part in a form of the computer program product. The computer program product includes at least one computer program. When the computer program is loaded and executed on the computer, all or part of the processes or functions according to embodiments of the present disclosure will be generated. The computer may be a general purpose computer, a special purpose computer, a computer network, or other programmable devices. The computer program may be stored in a computer-readable storage medium or transmitted from one computer-readable storage medium to another computer-readable storage medium. For example, the computer program may be transmitted from one website site, computer, server or data center to another website site, computer, server or data center in a wired manner (such as via a coaxial cable, an optical fiber, a digital subscriber line (DSL)) or a wireless manner (such as via infrared, wireless, or microwave, etc.). The computer-readable storage medium may be any available medium that can be accessed by the computer, or a data storage device such as a server or a data center integrated by one or more available media. The available medium may be a magnetic medium (for example, a floppy disk, a hard disk, or a magnetic tape), an optical medium (for example, a high-density digital video disc (DVD)), or a semiconductor medium (for example, a solid state disk (SSD)).

Unless the context otherwise requires, throughout the specification and the claims, terms "include" and its other forms such as a third person singular form "includes" and a present participle form "including" are interpreted as open and inclusive, it means "including, but not limited to". In the descriptions of the specification, the terms "some embodiments", "exemplary embodiments" or the like are intended to indicate that a particular feature, structure, material or characteristic associated with the embodiment or example is included in at least one embodiment or example of the present disclosure. The example representations of the above terms do not necessarily refer to a same embodiment or example. In addition, the particular feature, structure, material or characteristic may be included in any one or more embodiments or examples in any suitable manner.

Those of ordinary skill in the art can understand that the first, second, and other numeral numbers involved in the present disclosure are only for convenience of description, and are not intended to limit the scope of embodiments of the present disclosure, nor are they intended to represent a sequential order.

"At least one" in the present disclosure may also be described as one or more, and "multiple" may be two, three, four, or more, and the present disclosure is not limited thereto. In embodiments of the present disclosure, regarding one technical feature, the technical features in the technical feature are distinguished by "first", "second", "third", "A", "B", "C" and "D", etc. and there is no order of precedence or order of magnitude between the technical features described by the "first", "second", "third", "A", "B", "C"

and “D”. The expression “A and/or B” includes following three cases: only A, only B, and a combination of A and B.

Those of ordinary skill in the art can appreciate that the units and algorithm steps of various examples described in conjunction with embodiments disclosed herein may be implemented by the electronic hardware, or a combination of the computer software and the electronic hardware. Whether these functions are executed by the hardware or the software depends on the specific applications and design constraints of the technical solution. For each particular application, those skilled in the art may use different methods to implement the described functions, but such implementation should not be considered beyond the scope of the present disclosure.

Those skilled in the art can clearly understand that for the convenience and brevity of the description, the specific working process of the above-described system, device and unit may refer to the corresponding process in the foregoing method embodiments, which will not be repeated here.

The above only describes some specific implementations of the present disclosure, but the protection scope of the present disclosure is not limited thereto. Any changes or substitutions that are conceivable to those skilled in the art within the technical scope of the present disclosure should fall within the protection scope of the present disclosure. Therefore, the protection scope of the present disclosure should be determined by the protection scope of the claims.

What is claimed is:

1. A resource allocation method, performed by a network device, the method comprising:

configuring indication information for a first type of terminal, wherein the indication information is configured to indicate a physical random access channel (PRACH) resource shared by the first type of terminal;

wherein a 2-step RACH resource of a second type of terminal and a 4-step RACH resource of the second type of terminal are configured, and the method further comprises:

instructing, by the network device, the first type of terminal to share at least part of PRACH resources of the second type of terminal via a first signaling.

2. The method according to claim 1, wherein a 4-step RACH of the first type of terminal, a 2-step RACH of the first type of terminal and the 4-step RACH of the second type of terminal shares a same random access channel occasion (RO) resource.

3. The method according to claim 2, wherein one synchronization signal block (SSB) corresponds to a plurality of RO resources, and the method further comprises:

configuring a first PRACH mask and a second PRACH mask for the 2-step RACH of the first type of terminal and the 4-step RACH of the first type of terminal, respectively;

wherein the first PRACH mask is configured to determine a first subset of RO resources of the 4-step RACH of the second type of terminal, and the first subset is shared with the 4-step RACH of the first type of terminal; and the second PRACH mask is configured to determine a second subset of RO resources of the 4-step RACH of the second type of terminal, and the second subset is shared with the 2-step RACH of the first type of terminal.

4. The method according to claim 2, wherein one SSB corresponds to a plurality of RO resources, a PRACH mask is configured for the 4-step RACH of the first type of terminal and a PRACH mask is not configured for the 2-step RACH of the first type of terminal, the 2-step RACH of the first type terminal uses the same RO resource as the 4-step RACH of the first type of terminal or uses the same RO resource as the 4-step RACH of the second type of terminal.

5. The method according to claim 2, wherein one SSB corresponds to a plurality of RO resources, and a PRACH mask is configured for the 2-step RACH of the first type of terminal and the PRACH mask is not configured for the 4-step RACH of the first type of terminal, the 4-step RACH of the first type of terminal uses the same RO resource as the 2-step RACH of the first type of terminal; or the 4-step RACH of the first type of terminal uses the same RO resource as the 4-step RACH of the second type of terminal; or a configuration of configuring a PRACH mask for the 2-step RACH of the first type of terminal, but not configuring a PRACH mask for the 4-step RACH of the first type of terminal is not supported.

6. The method according to claim 1, wherein instructing the first type of terminal comprises:

configuring a same first indication parameter for a 2-step RACH of the first type of terminal and a 4-step RACH of the first type of terminal; or configuring an independent second indication parameter for a 2-step RACH and a 4-step RACH of the first type of terminal respectively.

7. The method according to claim 6, further comprising:

the first indication parameter or the second indication parameters being configured to indicate that the 2-step RACH of the first type of terminal and the 4-step RACH of the first type of terminal only share one of an RO resource of the 2-step RACH of the second type of terminal and an RO resource of the 4-step RACH of the second type of terminal; or the first indication parameter or the second indication parameters being configured to indicate that the 2-step RACH of the first type of terminal and the 4-step RACH of the first type of terminal share at least one of an RO resource of the 2-step RACH of the second type of terminal and an RO resource of the 4-step RACH of the second type of terminal.

8. The method according to claim 7, wherein the independent second indication parameter is configured for the 2-step RACH and the 4-step RACH of the first type of terminal respectively, and the second indication parameters are configured to indicate that the 2-step RACH of the first type of terminal and the 4-step RACH of the first type of terminal only share one of the RO resource of the 2-step RACH of the second type of terminal and the RO resource of the 4-step RACH of the second type of terminal, wherein the method further comprises one of the following:

configuring a PRACH mask respectively for the 2-step RACH of the first type of terminal and the 4-step RACH of the first type of terminal; or configuring one same PRACH mask for different RACH manners of the first type of terminal.

9. The method according to claim 1, wherein a 2-step RACH resource of a second type of terminal and a 4-step RACH resource of the second type of terminal are configured, a 2-step RACH of the first type of terminal and a 4-step RACH of the first type of terminal only shares an RO resource of a 4-step RACH of the second type of terminal; or a 2-step RACH of the first type of terminal only shares an RO resource of a 2-step RACH of the second type of terminal, and a 4-step RACH of the first type of terminal only shares an RO resource of a 4-step RACH of the second type of terminal.

10. The method according to claim 1, wherein a 4-step RACH resource of a second type of terminal and a 2-step RACH resource of the first type of terminal are configured, a configuration of configuring the 2-step RACH resource of the first type of terminal but not configuring a 4-step RACH resource of the first type of terminal is not supported in an initial random access phase; or a 4-step RACH of the first type of terminal shares an RO resource of a 4-step RACH of the second type of terminal.

11. The method according to claim 1, wherein a 2-step RACH resource of a second type of terminal, a 4-step RACH resource of the second type of terminal and a 2-step RACH resource of the first type of terminal are configured, a configuration of configuring the 2-step RACH resource of the first type of terminal but not configuring a 4-step RACH resource of the first type of terminal is not supported in an initial random access phase; or a 4-step RACH of the first type of terminal shares an RO resource of a 4-step RACH of the second type of terminal.

12. The method according to claim 1, wherein a 4-step RACH resource of the first type of terminal and a 4-step RACH resource of a second type of terminal are configured, a 2-step RACH of the first type of terminal shares an RO resource of a 4-step RACH of the second type of terminal.

13. The method according to claim 1, wherein the 4-step RACH resource of the first type of terminal, a 2-step RACH resource of the second type of terminal and the 4-step RACH resource of the second type of terminal are configured, a 2-step RACH of the first type of terminal shares an RO resource of a 2-step RACH of the second type of terminal; or a 2-step RACH of the first type of terminal shares an RO resource of a 4-step RACH of the second type of terminal.

14. The method according to claim 1, wherein a current cell only supports 4-step RACHs for the first type of terminal and a second type of terminal, and a 4-step RACH resource of the second type of terminal is configured, a 4-step RACH of the first type of terminal sharing the 4-step RACH resource of the second type of terminal.

15. The resource allocation method according to claim 1, further comprising:

sending the indication information, wherein the first type of terminal is a reduced capability (Redcap) terminal applicable to one or more target features, and the second type of terminal is a non-Redcap terminal;

wherein in a case where the 2-step RACH resource of the second type of terminal is not configured and only the 4-step RACH resource of the second type of terminal is configured, and one SSB corresponds to a plurality of RO resources, a first PRACH mask and a second PRACH mask are respectively configured, via the indication information, for a 4-step RACH of the first type of terminal and a 2-step RACH of the first type of terminal;

the first PRACH mask is used to determine a first subset from a plurality of RO resources of the 4-step RACH of the second type of terminal, and the first subset is shared with the 4-step RACH of the first type of terminal; and the second PRACH mask is used to further determine a second subset from the first subset and share the second subset with the 2-step RACH of the first type of terminal.

16. The resource allocation method according to claim 15, wherein on RO resources in the second subset, the first type of terminal is configured to use preamble sequences associated with the one or more target features, and the preamble sequences are different from preamble sequences used by the second type of terminal on the RO resources in the second subset, to indicate, before a completion of a random access procedure, to the network device that the first type of terminal is applicable to the one or more target features.

17. A network device, comprising:

a processor; and a memory having stored therein a computer program that, when executed by the processor, causes the network device to implement a resource allocation method comprising:

configuring indication information for a first type of terminal, wherein the indication information is configured to indicate a physical random access channel (PRACH) resource shared by the first type of terminal;

wherein a 2-step RACH resource of a second type of terminal and a 4-step RACH resource of the second type of terminal are configured, and the computer program is executed by the processor to cause the network device to implement:

instructing the first type of terminal to share at least part of PRACH resources of the second type of terminal via a first signaling.

18. A resource allocation method, performed by a first type of terminal, the method comprising:

receiving indication information configured by a network device, and obtaining a physical random access channel (PRACH) resource shared by the first type of terminal according to the indication information;

wherein a 2-step RACH resource of a second type of terminal and a 4-step RACH resource of the second type of terminal are configured, and the method further comprises:

receiving a first signaling of the network device, wherein the first type of terminal shares at least part of PRACH resources of the second type of terminal.

19. The network device according to claim 17, wherein the computer program is executed by the processor to cause the network device to implement:

send the indication information, wherein the first type of terminal is a reduced capability (Redcap) terminal applicable to one or more target features, and the second type of terminal is a non-Redcap terminal;

wherein in a case where the 2-step RACH resource of the second type of terminal is not configured and only the 4-step RACH resource of the second type of terminal is configured, and one SSB corresponds to a plurality of RO resources, a first PRACH mask and a second PRACH mask are respectively configured, via the indication information, for a 4-step RACH of the first type of terminal and a 2-step RACH of the first type of terminal;

the first PRACH mask is used to determine a first subset from a plurality of RO resources of the 4-step RACH of the second type of terminal, and the first subset is shared with the 4-step RACH of the first type of terminal; and the second PRACH mask is used to further determine a second subset from the first subset and share the second subset with the 2-step RACH of the first type of terminal.

20. A terminal, comprising:

a processor; and a memory having stored therein a computer program, that, when executed by the processor, causes the terminal to implement the method according to claim 18.

* * * * *